US011333569B2

(12) United States Patent
Lint et al.

(10) Patent No.: US 11,333,569 B2
(45) Date of Patent: May 17, 2022

(54) DYNAMIC BALANCER WITH A FRAMELESS MOTOR DRIVE

(71) Applicant: AKRON SPECIAL MACHINERY, INC., Akron, OH (US)

(72) Inventors: Charles A. Lint, Massillon, OH (US); Kevin J. Rich, Louisville, OH (US); Curtiss L. Wegman, Ravenna, OH (US); William P. Laughlin, Bath, OH (US)

(73) Assignee: AKRON SPECIAL MACHINERY, INC., Akron, OH (US)

( * ) Notice: Subject to any disclaimer, the term of this patent is extended or adjusted under 35 U.S.C. 154(b) by 185 days.

(21) Appl. No.: 16/565,681

(22) Filed: Sep. 10, 2019

(65) Prior Publication Data

US 2020/0088601 A1 Mar. 19, 2020

Related U.S. Application Data

(60) Provisional application No. 62/731,238, filed on Sep. 14, 2018.

(51) Int. Cl.
*G01M 1/22* (2006.01)
*G01M 1/04* (2006.01)

(52) U.S. Cl.
CPC ............ *G01M 1/225* (2013.01); *G01M 1/045* (2013.01)

(58) Field of Classification Search
CPC .......... G01M 1/045; G01M 1/06; G01M 1/20; G01M 1/225; G01M 17/021
See application file for complete search history.

(56) References Cited

U.S. PATENT DOCUMENTS

| 2,127,950 A | 8/1938 | Bennett |
| 2,970,844 A | 2/1961 | Better |
| 3,788,658 A | 1/1974 | Benjamin et al. ............... 279/75 |
| 4,085,619 A * | 4/1978 | Shapiro ................. G01M 1/225 73/462 |
| 4,322,190 A | 3/1982 | Anderson ..................... 409/234 |

(Continued)

FOREIGN PATENT DOCUMENTS

| EP | 0 496 489 A2 | 7/1992 | ............ G01M 17/02 |
| EP | 2 682 726 A2 | 1/2014 | .............. G01M 1/06 |

OTHER PUBLICATIONS

European Search Report dated Jul. 29, 2020 in related application No. EP 19197231.14.

*Primary Examiner* — Natalie Huls
(74) *Attorney, Agent, or Firm* — Renner, Kenner, Greive, Bobak, Taylor & Weber

(57) ABSTRACT

A dynamic balancer includes an outer housing and a spindle assembly rotatably mounted to the outer housing. A frameless motor assembly is connected to selected components of the spindle assembly. A chucking assembly receives a locking member to capture a tire therebetween. The chucking assembly and the locking member are captured in the spindle assembly and rotated by the frameless motor assembly. A spring-biased return cylinder may be used with the dynamic balancer to assist in capturing and releasing the locking member with respect to the chucking assembly. An adjustable encoder assembly may be associated with the motor assembly to monitor a rotational position of the tire and/or spindle assembly.

8 Claims, 18 Drawing Sheets

(56) References Cited

U.S. PATENT DOCUMENTS

| | | | | |
|---|---|---|---|---|
| 4,478,081 | A * | 10/1984 | Greene | G01M 1/045 157/21 |
| 4,502,328 | A | 3/1985 | Wood et al. | 73/462 |
| 4,916,943 | A * | 4/1990 | Himmler | G01M 17/021 141/4 |
| 4,951,510 | A | 8/1990 | Holm-Kennedy et al. | 73/862.04 |
| 5,033,003 | A * | 7/1991 | Lees, Sr. | G01M 17/021 701/124 |
| 5,107,702 | A * | 4/1992 | Iwama | G01M 17/021 73/146 |
| 5,257,561 | A | 11/1993 | Folta | 82/165 |
| 5,259,242 | A * | 11/1993 | Folta | G01M 17/021 157/13 |
| 5,383,361 | A | 1/1995 | Matumoto | 73/146 |
| 5,396,436 | A | 3/1995 | Parker et al. | 364/508 |
| 5,600,062 | A | 2/1997 | Moench | 73/462 |
| 5,674,031 | A * | 10/1997 | Bilz | B23Q 17/002 408/6 |
| 6,131,455 | A * | 10/2000 | Matsumoto | G01M 1/225 73/462 |
| 6,308,566 | B1 | 10/2001 | Matsumoto et al. | 73/462 |
| 6,481,281 | B1 * | 11/2002 | Gerdes | G01M 1/045 279/131 |
| 6,658,936 | B2 * | 12/2003 | Matsumoto | G01M 1/225 73/460 |
| 6,772,626 | B1 * | 8/2004 | Engel | G01M 1/225 73/146 |
| 7,140,242 | B1 | 11/2006 | Poling, Sr. et al. | 73/146 |
| 7,434,454 | B2 | 10/2008 | Matsumoto | 73/146 |
| 7,448,267 | B2 | 11/2008 | Williams et al. | 73/462 |
| 8,342,020 | B2 * | 1/2013 | Sumimoto | G01M 1/045 73/462 |
| 8,794,059 | B2 * | 8/2014 | Wollbrinck | G01M 17/021 73/146 |
| 10,371,593 | B2 | 8/2019 | Farelli et al. | G01M 1/225 |
| 2002/0100323 | A1 | 8/2002 | Haeg et al. | 73/503 |
| 2003/0046999 | A1 * | 3/2003 | Hansen | G01M 1/045 73/487 |
| 2005/0173039 | A1 * | 8/2005 | Hirata | B60B 25/00 152/396 |
| 2007/0156289 | A1 * | 7/2007 | Altieri | G01M 1/22 700/280 |
| 2009/0308156 | A1 | 12/2009 | Sumimoto et al. | 73/462 |
| 2010/0170340 | A1 * | 7/2010 | Warkotsch | G01M 1/045 73/487 |
| 2014/0191480 | A1 | 7/2014 | Miyazaki et al. | 279/133 |
| 2015/0167780 | A1 * | 6/2015 | Matteucci | G01M 1/225 301/5.22 |
| 2015/0241294 | A1 * | 8/2015 | Warkotsch | G01M 1/045 279/133 |
| 2017/0343453 | A1 * | 11/2017 | Farelli | G01M 1/04 |
| 2019/0070740 | A1 * | 3/2019 | Taylor | G01M 1/045 |
| 2021/0025784 | A1 * | 1/2021 | Matsumoto | B60C 19/00 |

* cited by examiner

DYNAMIC BALANCER WITH A FRAMELESS MOTOR DRIVE

CROSS-REFERENCE TO RELATED APPLICATIONS

This application claims priority of U.S. Provisional Application Ser. No. 62/731,238 filed Sep. 14, 2018, which is incorporated herein by reference.

TECHNICAL FIELD

The present invention relates to a dynamic balancer. In particular, the present invention is directed to a dynamic balancer which uses a frameless motor drive in determining a balance condition of a tire rotated by the balancer.

BACKGROUND ART

Manufactured tires generally undergo certain testing before being made available for sale to the public. One such test includes measuring the balance of a tire by rotating the tire at a high speed. The machines used for measuring the balance of a tire must secure the tire in position, inflate the tire, and then rotate the tire at a high speed while detecting forces during the tire's rotation.

Prior art devices typically utilize load cells that detect forces in an axial relation to the tire's rotation. Although effective in its stated purpose, it is believed that more accurate determinations of a balance condition can be obtained. For example, a common problem with prior art dynamic balancers results from the mechanism utilized to rotate the tire to determine a balance condition. Most all balancers employ a side-mounted motor that rotates a belt coupled to a spindle assembly that rotates the tire. A side-mounted drive motor, although effective, introduces radial forces to the spindle assembly, which must then be compensated for so as to not adversely affect sensors that determine the balance condition of the tire. This compensation may be done by either application of counter-balancing forces, use of sensors to determine added forces and computer processing to adjust the measured forces or a combination of both. Some dynamic balancers avoid the use of side mounted motors by employing a drive motor housing and an armature. However, such a configuration still employs opposed suspension springs, which become unbalanced after minimal use and introduce forces into the spindle assembly which must be compensated for, either of which result in distortions in the load cell measurement.

Another drawback of prior art dynamic balancers is the way in which the tire is secured to the machine prior to rotation. One prior art chuck locking mechanism employs ball bearings between an outer sleeve and an inner sleeve to hold the tire in place. Unfortunately, the bearings are easily misaligned and the sleeves do not engage with one another as they should.

Accordingly, there is a need in the art for an improved tire balancer that detects forces in a horizontal plane in relation to the tire's rotation. And there is a need to collect and process the forces detected in a meaningful way to properly identify a location and amount of a tire's out of balance condition.

SUMMARY OF THE INVENTION

In light of the foregoing, it is a first aspect of the present invention to provide a dynamic balancer with a frameless motor drive.

It is another aspect of the present invention to provide a dynamic balancer comprising an outer housing, a spindle assembly rotatably mounted to the outer housing, a frameless motor assembly connected to selected components of the spindle assembly, and a chucking assembly receiving a locking member to capture a tire therebetween, the chucking assembly and the locking member captured in the spindle assembly and rotated by the frameless motor assembly.

It is a further aspect of the present invention to provide a dry brake air mechanism adapted for use with a dynamic balancer that has a locking shaft with an air supply bore therethrough to inflate a tire received by the dynamic balancer, the mechanism comprising a coupling mate adapted to be received in the air supply bore, a system housing that carries a manifold having an air coupling at one end that is selectively connected to the coupling mate, and a linear actuator coupled to the manifold to selectively move the air coupling into and out of engagement with the coupling mate, wherein both the air coupling and the coupling mate are sealed when disengaged from one another and open when engaged with one another.

Yet another aspect of the present invention is to provide a chucking assembly engageable with a locking shaft, comprising a lower rim having a shaft opening therethrough to receive the locking shaft, the lower rim having at least one tee cavity, at least one wedge jaw radially movable in a corresponding one of the at least one tee cavities, the at least one wedge jaw having one side with jaw teeth that are engageable with the locking shaft when received in the shaft opening, and at least one wedge sleeve slidably engageable with an opposite side of the at least one wedge jaw, wherein axial movement of the at least one wedge sleeve moves the at least one wedge jaw into and out of engagement with the locking shaft.

Still another aspect of the present invention is to provide a spring-biased return cylinder adapted for use with a dynamic balancer that has a spindle shaft axially extending through a rotatable spindle assembly, the spring-biased return cylinder comprising a main cylinder having a shaft opening therethrough that receives the spindle shaft, the main cylinder having an external radial ledge, an outer cylinder surrounding the main cylinder, the outer cylinder having an inward spring ledge, wherein the inward spring ledge faces the external radial ledge and forms an annular spring cavity therebetween which receives a cylindrical spring, and wherein the main cylinder is adapted to be axially movable so as to axially move the spindle shaft.

Yet another aspect of the present invention is to provide an encoder assembly comprising a motor assembly having a motor housing with a stator secured thereto and a rotor rotatably received within the stator, a mount plate secured to the motor housing, the mount plate having a plate notch, an encoder ring coupled to the rotor so as to rotate therewith, and an adjustment mechanism maintained in the plate notch and carrying a read head movable with respect to the encoder ring.

BRIEF DESCRIPTION OF THE DRAWINGS

These and other features and advantages of the present invention will become better understood with regard to the following description, appended claims, and accompanying drawings wherein:

BEST MODE FOR CARRYING OUT THE INVENTION

Figure 1:
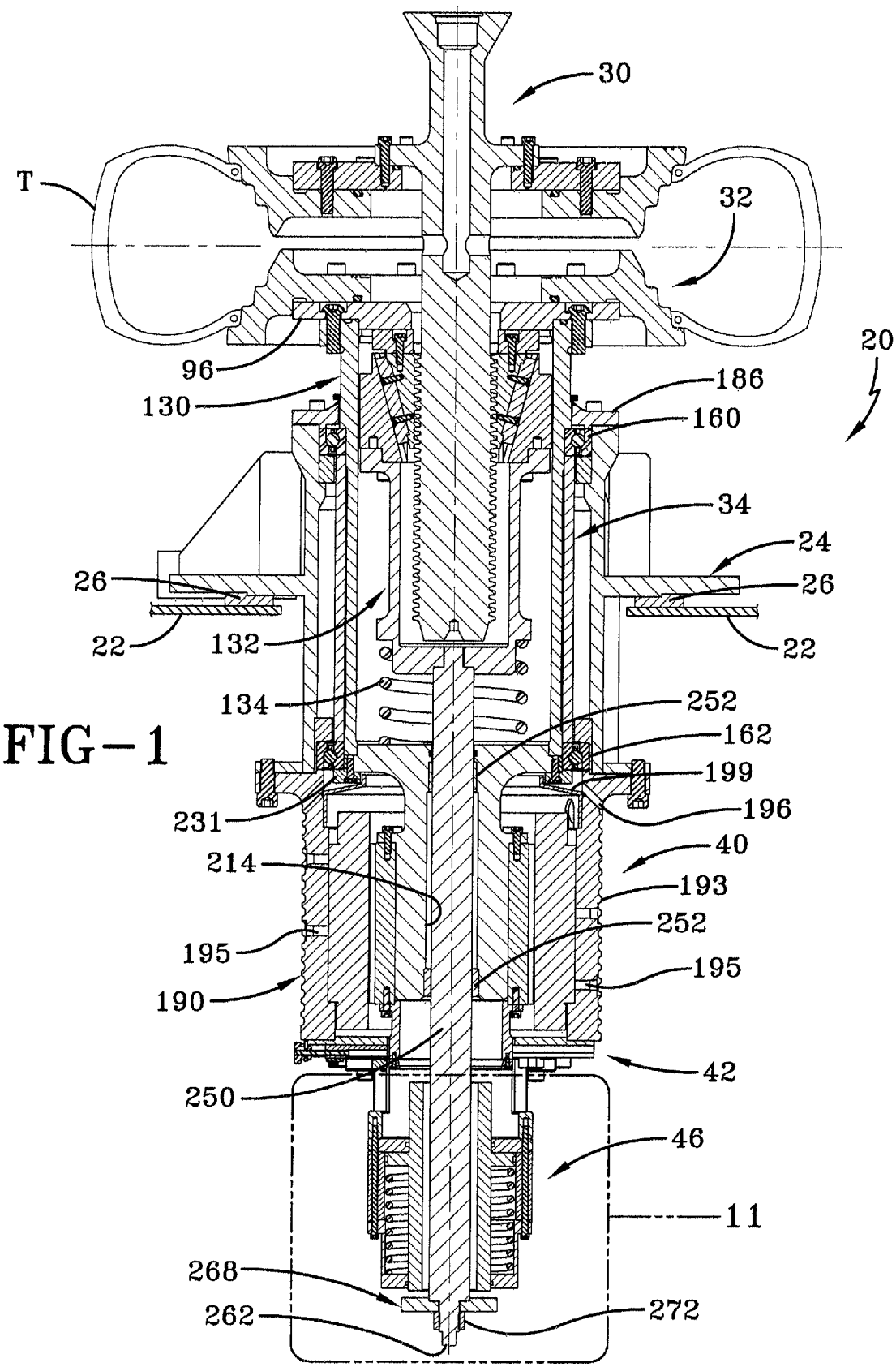
FIG. 1 is a cross-sectional view of a dynamic balancer shown in a locked position according to the concepts of the present invention.

Referring now to the drawings, and specifically to FIGS. 1, 2, 3A, 3B, and 3C, it can be seen that a dynamic balancer is designated generally by the numeral 20. Reference should be made to these specific drawings when reading any part of the specification. Where appropriate, specific reference may be made to the relevant drawings, but it will be appreciated that any of the drawings may show the item being described. As is well understood in the art, a dynamic balancer tests toroidal bodies, such as pneumatic tires. Generally, the balancer 20 includes a floor-supported frame 22 (partially shown) with appropriate structural features such as legs and cross members which carry the balancer. Skilled artisans will appreciate that the frame may be bolted or otherwise secured to a floor so as to minimize exposure to extraneous forces.

An outer housing 24 may be carried by the frame 22 and supports the major components of the dynamic balancer. Interposed between the frame 22 and outer housing 24 may be at least one load cell 26. In the present embodiment, four load cells 26 may be spaced—in substantially equal 90° increments or as otherwise appropriate—around the outer housing and are employed to detect and collect force measurement data during rotation of the tire by the balancer as will be described in detail as the description proceeds. Configuration and placement of the load cells with respect to the frame may be as described and shown in U.S. patent application Ser. No. 15/345,648 filed Nov. 8, 2016, which is incorporated herein by reference. In the present embodiment, the operational interface of the load cell(s) between the balancer 20 and the frame 22 is the only intentional interface between the two so as to substantially eliminate the application of any extraneous forces to the balancer during operation. As a result, a balance condition of the tire may be obtained with minimal interfering external forces incorporated into the balance measurement by the load cells.

Figure 2:
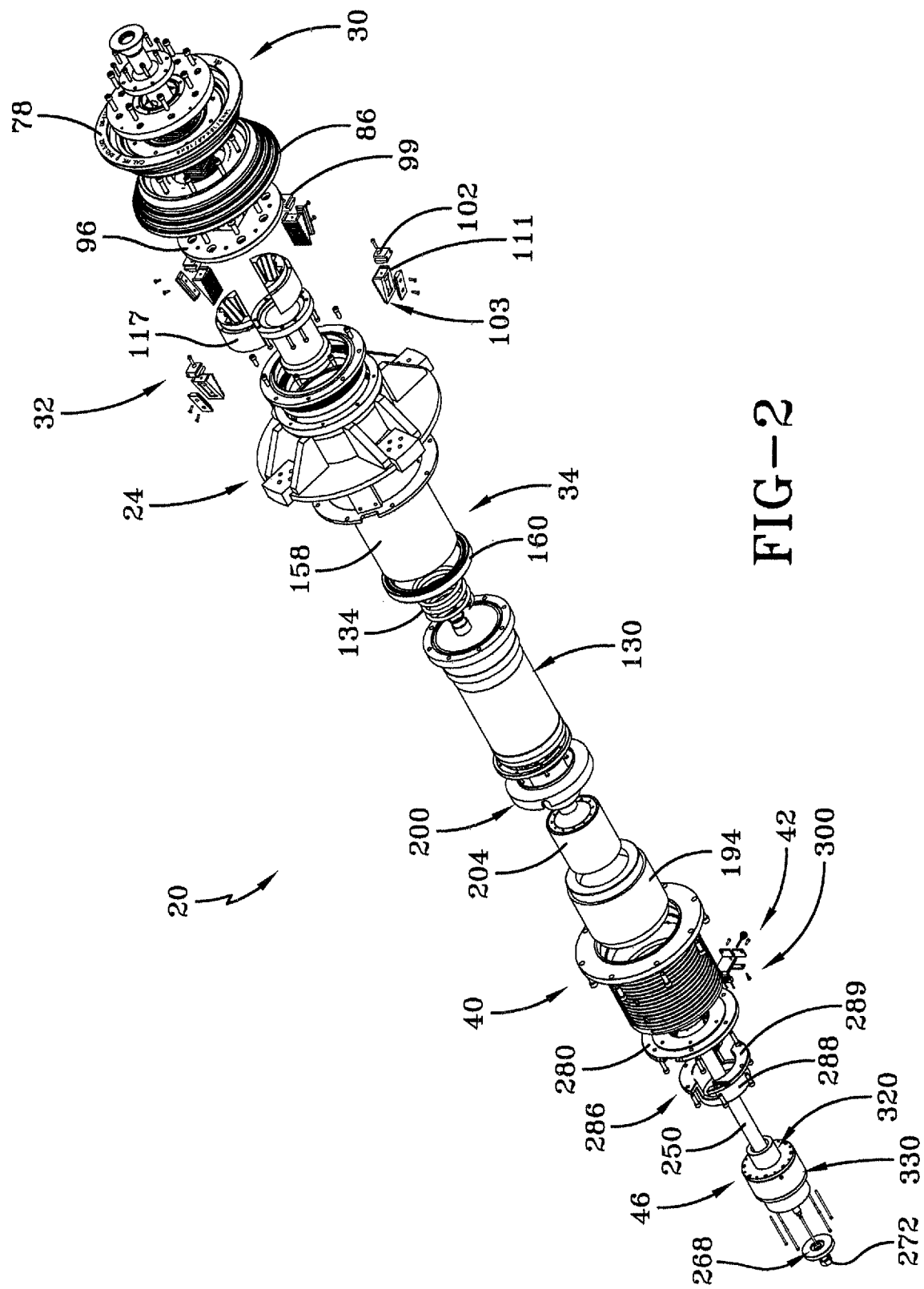
FIG. 2 is an exploded perspective view of the dynamic balancer according to the concepts of the present invention.

The major components of the balancer 20 may include a locking member 30 which is associated with and positions one side of the tire (T) and, in particular, a tire bead, wherein FIG. 2 shows the locking member 30 is received in a chucking assembly designated generally by the numeral 32. The chucking assembly grips the locking member and positions and captures an opposite bead of the tire. And, the chucking assembly 32 may be received in a spindle assembly 34 which rotates the chucking assembly and the tire which is mounted between the locking member and the chucking assembly. The spindle assembly 34 may be rotated by a frameless motor assembly 40 wherein the rotational position of the tire being rotated is detected and monitored by an encoder assembly 42 which is coupled to the frameless motor assembly 40. A spring-biased return cylinder 46 is associated with the frameless motor assembly and, as will be discussed in detail, assists in releasing and capturing the locking member 30 in conjunction with the chucking assembly 32.

Figure 3A:
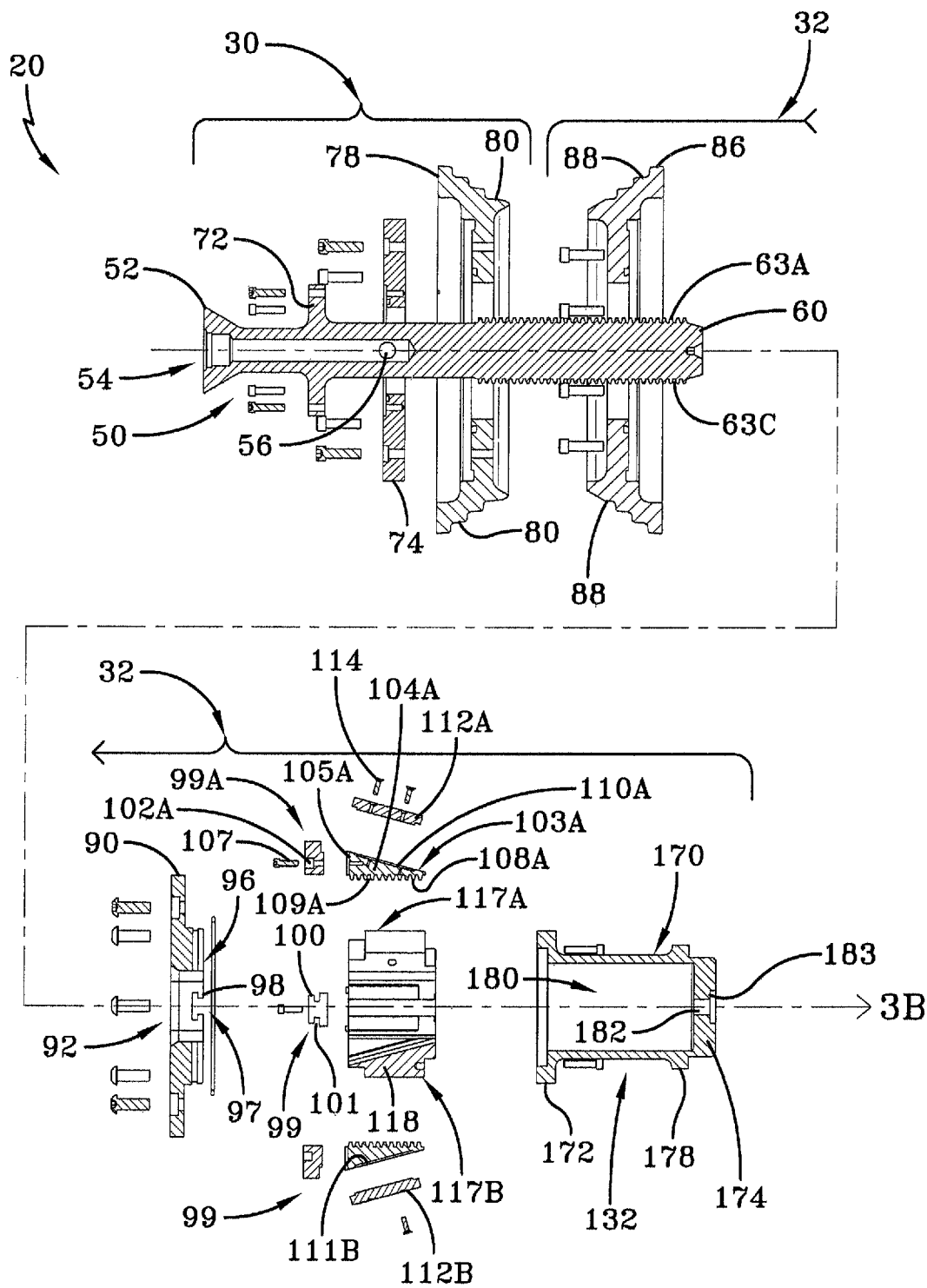
FIGS. 3A, 3B, and 3C are exploded cross-sectional views of the dynamic balancer according to the concepts of the present invention.

As best seen in FIG. 3A, the locking member 30 includes a locking shaft 50 which provides an outward taper 52 at one end. Skilled artisans will appreciate that a dry brake air system (to be described) may be coupled to the taper 52 and/or adjacent portion of the shaft 50 for the purpose of moving the locking member into and out of the chucking assembly 32 and inflating/deflating the tire. The locking shaft moves vertically into and out of the chucking assembly 32 in a manner that will be described as the description proceeds. Extending axially into the shaft at the outward taper end is an air supply bore 54. Extending through the locking shaft 50 is a cross bore 56 which intersects with the air supply bore 54 and is contiguous therewith. At an end opposite the outward taper 52 is a distal end 60.

Figure 4:
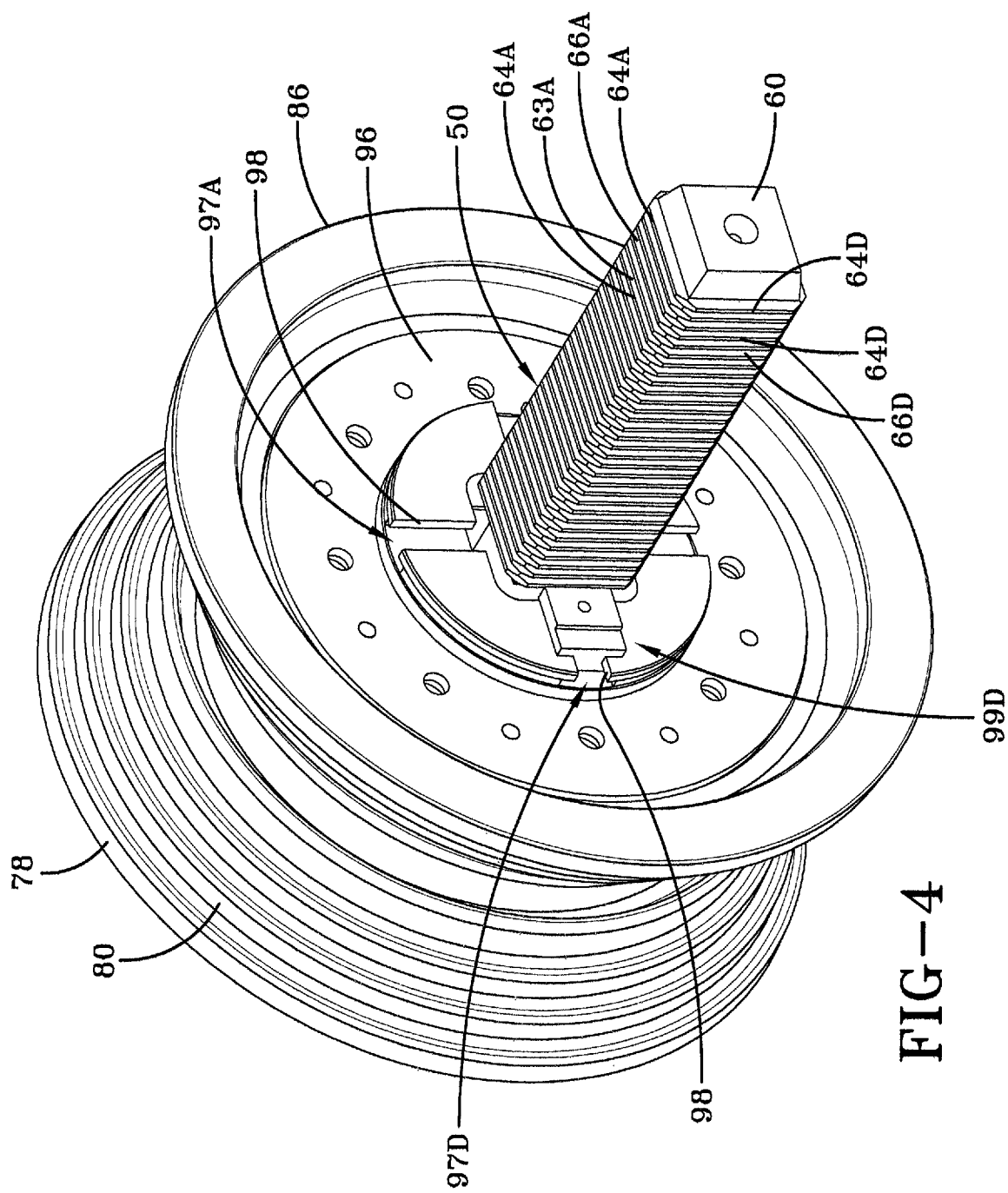
FIG. 4 is a lower perspective view of a locking member received through a lower rim which is part of a chucking assembly of the dynamic balancer according to the concepts of the present invention.
Figure 5A:
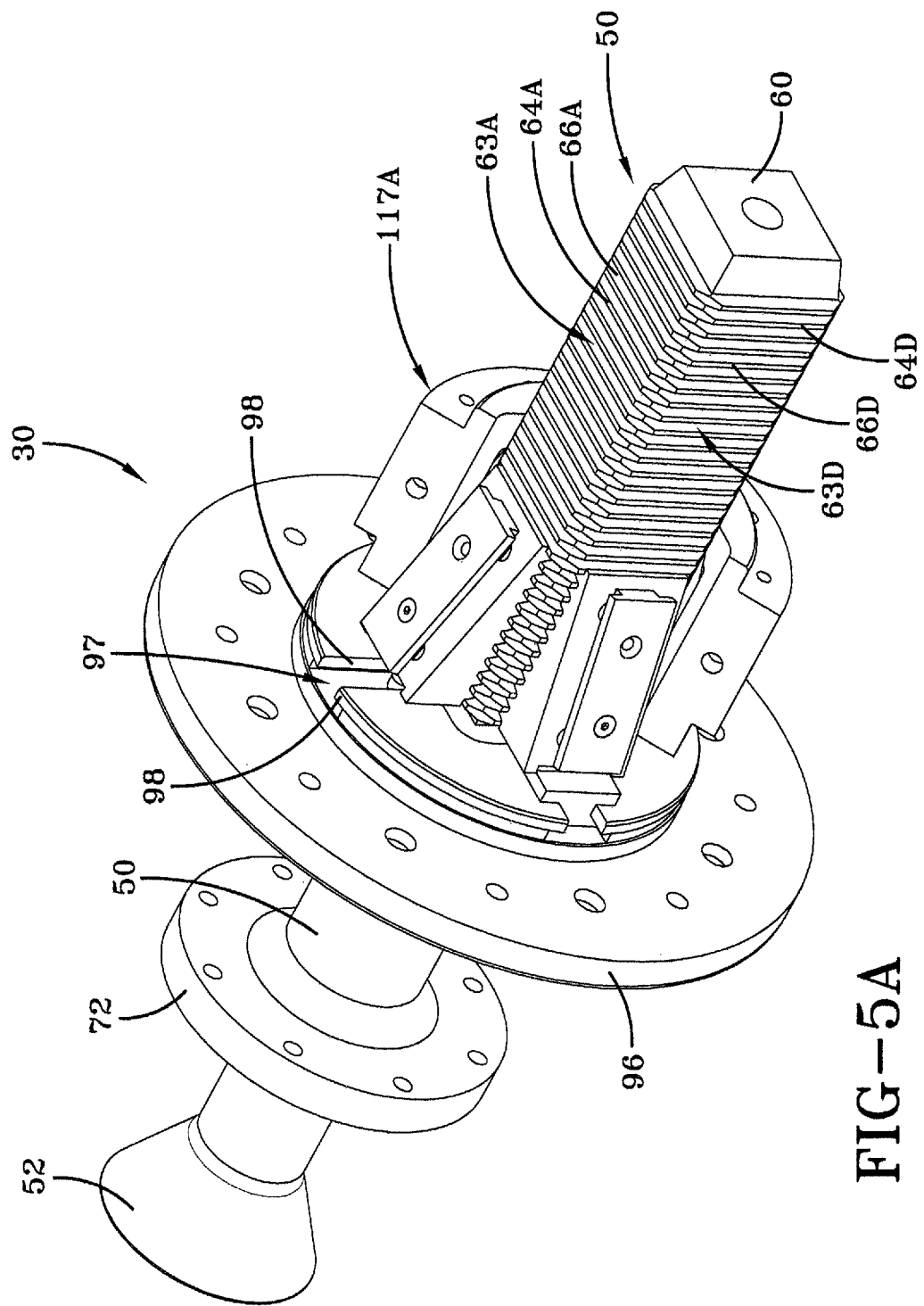
FIG. 5A is a perspective view of selected components of the locking member and the chucking assembly according to the concepts of the present invention.
Figure 5B:
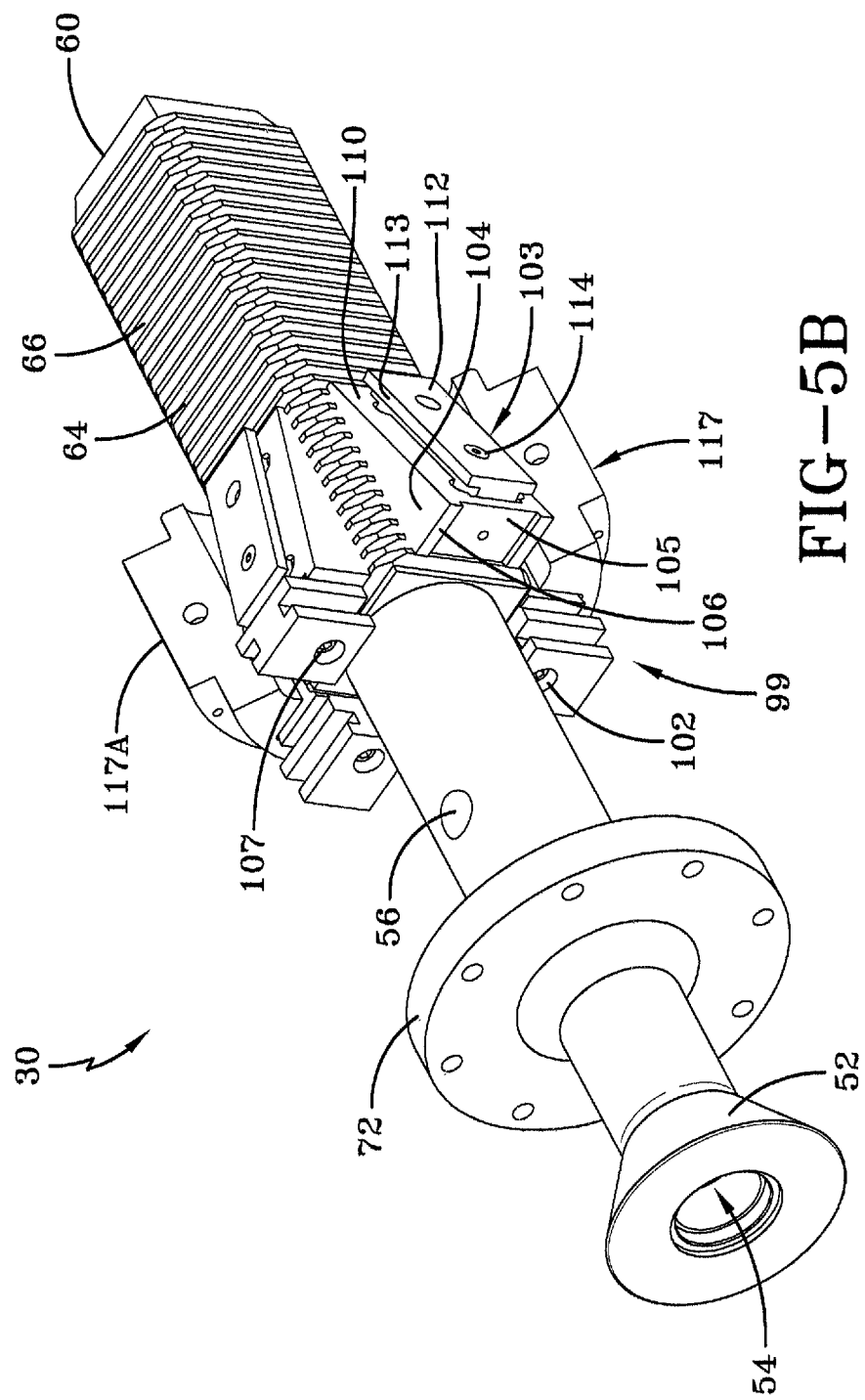
FIG. 5B is another perspective view of selected components of the locking member and the chucking assembly according to the concepts of the present invention.

In some embodiments, the locking shaft 50 may have a non-circular cross-section as best seen in FIGS. 4, 5A, and 5B. Such a feature facilitates the engagement and locking of the shaft with the chucking assembly which receives the shaft, both of which are subsequently rotated by the spindle assembly during a balancing operation. In such an embodiment, care must be taken to properly angularly align the chucking assembly to receive the locking shaft, and this can be easily done by coordination between the encoder assembly 42 and the motor assembly 40 as will be discussed. In any event, the locking shaft in the present embodiment provides a substantially square cross-section, wherein the shaft 50 provides multiple locking sides 63 and wherein each locking side is provided with a corresponding alphabetic suffix A-D. Each locking side 63A-D provides a plurality of shaft teeth 64A-D wherein a gap 66A-D is provided between each tooth. As a result, the locking sides 63A-D provide shaft teeth 64 that extend from about a mid-point of the shaft 50 to the distal end 60 of the shaft opposite the outward taper 52. And the teeth 64 are provided on linear surfaces that effectively form a square cross section of the locking shaft. As such, in the present embodiment, the locking shaft provides four sides that facilitate engagement with the chucking assembly 32 as will be described.

A shaft collar 72, as best seen in FIGS. 3A, 5A, and 5B, may extend radially from the shaft 50 at a position between the cross bore 56 and the outward taper 52. The shaft collar 72 may be attached with fasteners to a shaft flange 74 which may be attached with fasteners to an upper rim 78 which rotates when the locking shaft is rotated. An outer circular surface of the upper rim 78 may provide for a plurality of diametrically inward steps 80 to accommodate various tire bead diameters.

Figure 7:
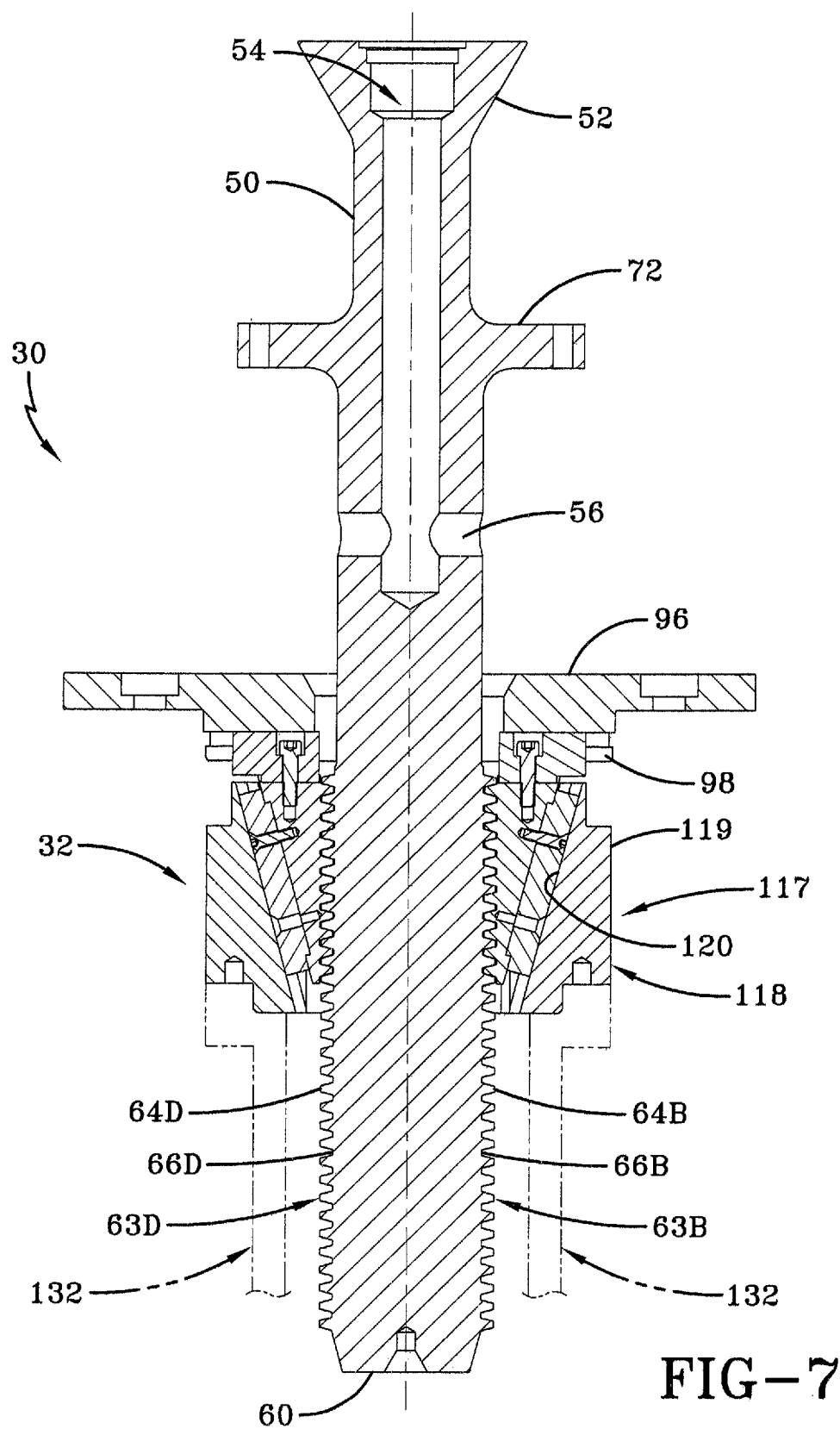
FIG. 7 is a cross-sectional view of the locking member received in the chucking assembly in a default position according to the concepts of the present invention.
Figure 8:
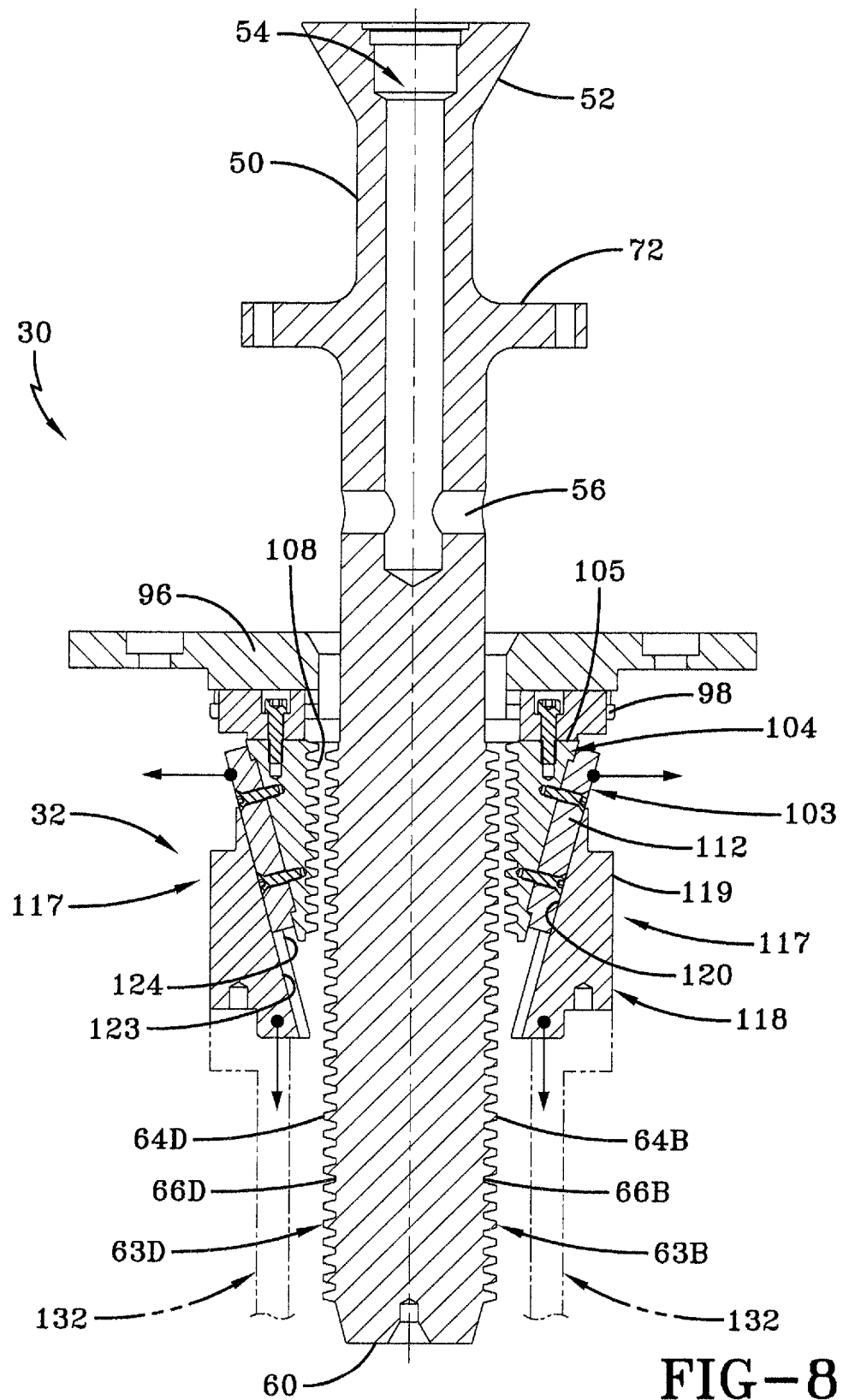
FIG. 8 is a cross-sectional view of the locking member received in the chucking assembly in an unlocked position according to the concepts of the present invention.

As is generally apparent from FIGS. 3A, 7 and 8, the chucking assembly 32 receives and holds a tire by virtue of engagement with the locking member 30. When the locking member 30 and chucking assembly 32 secure the tire therebetween, they are collectively secured within the spindle assembly 34. As will be discussed at the appropriate time, air is transferred through the air supply bore and the cross bore 56 to inflate the tire, whereupon the spindle assembly 34 rotates the captured tire to determine a balance condition and other characteristics of the tire.

Figure 1A:
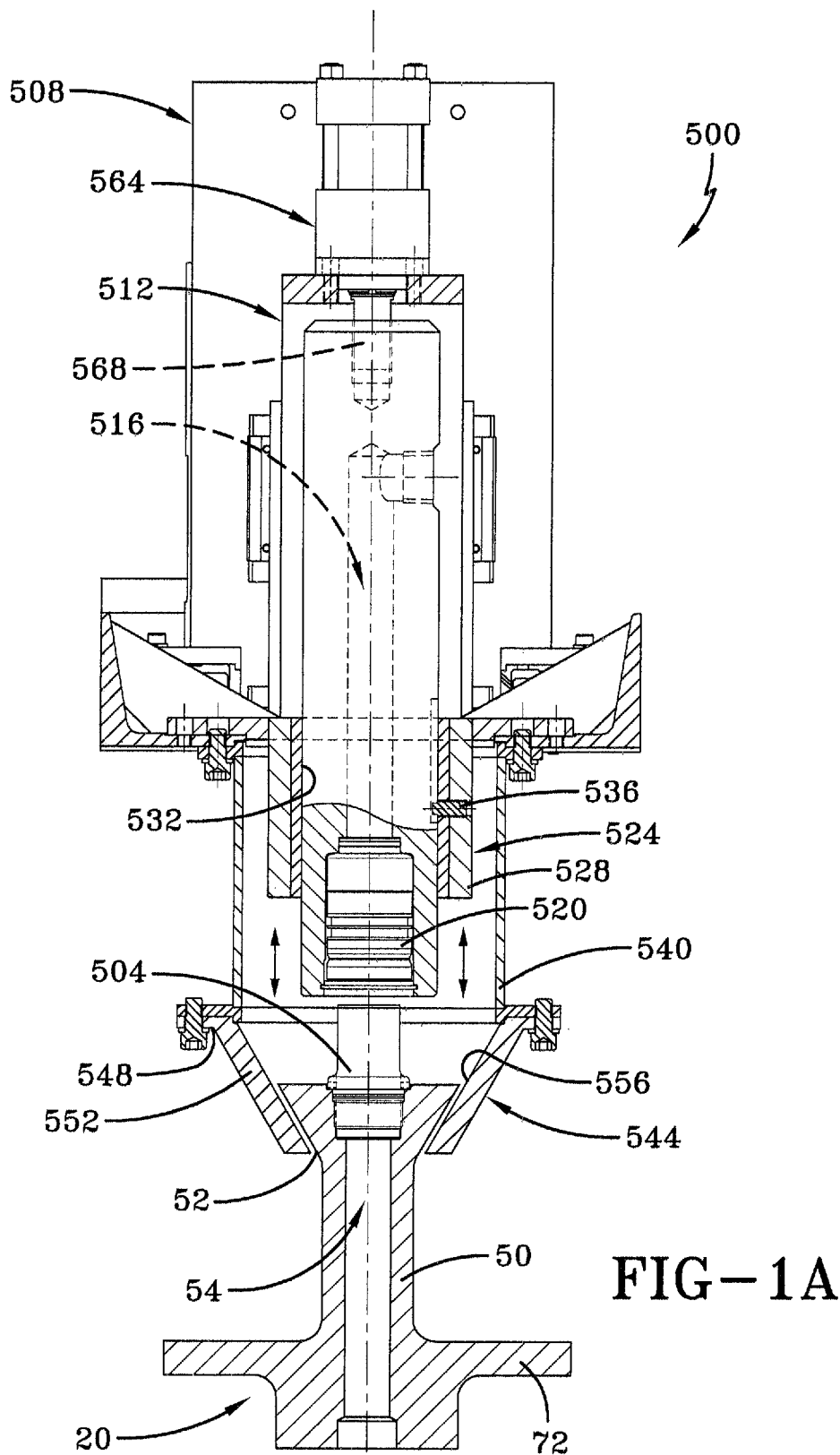
FIG. 1A is a partial cross-sectional view of a dry brake air system associated with the dynamic balancer according to the concepts of the present invention.

Referring now to FIG. 1A, it can be seen that a dry brake air system is designated generally by the numeral 500 and is operatively coupled to the dynamic balancer 20. The balancer 20 accommodates connection to the air system 500 by incorporating a coupling mate 504 which is received in the air supply bore 54 of the locking shaft 50. As will become apparent as the detailed description proceeds, the coupling mate 504 is selectively coupled to the brake air system 500 for the purpose of directing pressurized air into and out of the air supply bore 54 and the cross bore 56 so as to inflate and deflate the tire at the appropriate times.

The air system 500 includes a system housing 508 which provides the necessary structure for holding the components of the system 500. One of these components is a manifold 512 which provides a conduit 516 that receives pressurized air as will be discussed. At one end of the conduit 516 is an air coupling 520 which is selectively coupled to the coupling mate 504. An exemplary coupling mate 504 and air coupling 520 may be provided by Staubli of Switzerland, wherein their SPC family of connectors provide an exemplary connection system that may be employed.

Continuing with FIG. 1A, an end of the manifold 512 may provide a sealing skirt 524 which partially surrounds the air coupling 520. The sealing skirt 524 includes a sleeve 528 and a bushing 532. The sleeve 528 and the bushing 532 allow for slidable movement of the air coupling 520 within the manifold 512 at the appropriate times. Extending from a lower end of the housing 508 is a shroud 540 which substantially surrounds the sealing skirt 524 to prevent debris from entering the coupling mate 504 or the air coupling 520. Connected to and extending from the lower edge of the shroud 540 is an interface collar 544. The collar 544 includes an attachment ledge 548 which is secured to a lower end of the shroud 540 by appropriate fasteners. Extending inwardly from the ledge 548 is a conical flange 552 which provides for a flange inner surface 556 which is sized to fit around the taper 52 of the locking shaft. Skilled artisans will appreciate that the flange inner surface 556 only comes in contact with the taper 52 when the locking shaft is being lifted away from the chucking assembly, as will be described in detail later. However, when the locking shaft is received in the chucking assembly, the flange inner surface is in a non-contacting spaced-apart relationship with the taper 52 so that there are no direct forces applied to the taper. As a result, no extraneous forces from the conical flange 552 are applied to the spindle assembly 34 during the balancing operation. In other words, the non-contacting relationship between the conical flange 552 and the taper 52 is done so that no forces are transferred between the interface of these two parts during rotation of the locking shaft.

The system 500 may include a linear actuator 564 which may be coupled to an end of the manifold 512 at an end opposite the sealing skirt 524. Extending from the linear actuator 564 is an actuator rod 568 wherein movement of the actuator rod is controlled by a controller as will be discussed. In any event, the actuator rod 568 moves the manifold in an up/down or vertical direction. Downward movement of the rod 568 results in connection of the air coupling 520 to the coupling mate 504. Upward movement of the actuator rod 568 results in a de-coupling of the air coupling 520 from the coupling mate 504. Skilled artisans will appreciate that the coupling mate 504 and the air coupling 520 are configured such that both are sealed when they are disengaged from one another and that air may only flow between the two, in either direction, when both are securely seated or coupled with each other.

In operation, at the appropriate time, the actuator 564 is energized so that the actuator rod 568 lowers the air coupling 520 into engagement with the coupling mate 504. Somewhat simultaneously, the locking shaft 50 is lowered by the conical flange and locked as will be described in detail later. Once the air coupling 520 is engaged with the coupling mate 504, the collar 544 is lowered an incremental amount so that the flange inner surface 556 is no longer in contact with the taper 52. Next, air and/or some other type of gas, which may be pressurized, is delivered through the manifold conduit 516 and into the supply bore 54 and the cross bore 56 so as to seat the tire beads into the respective rims and pressurize the tire to be tested. Once the inflation of the tire is complete, the air coupling 520 is disengaged from the coupling mate 504 and the tire remains pressurized by the closing of the coupling mate. The disengagement of the air coupling 520 from the coupling mate 504 does not cause the flange surface 556 to come in contact with the taper 52.

During rotation of the locking shaft, the taper 52 is no longer in a contacting relationship with the flange inner surface 556, although in close proximity thereto. As such, no mechanical or other forces are exerted on any rotating part of the dynamic balancer 10 by the air system 500. Upon completion of the balancing test, the air coupling re-engages the coupling mate 504 so as to release the air within the tire to ambient. Next, at the appropriate time, the actuator rod 568 is lifted so that the flange inner surface 556 engages the taper surface 52 and lifts the locking shaft out of the chucking assembly.

Referring now to FIGS. 3A, and 4-8, it can be seen that the chucking assembly 32 includes a lower rim 86 which, in most embodiments, is substantially a mirror image of the upper rim 78. The lower rim 86 provides for a plurality of diametrically inward steps 88 which match the steps 86 of the upper rim so as to match various bead diameters of various tires that may be tested by the dynamic balancer. An inner flange 90 may be connected by fasteners to and extend radially inwardly from the rim 86 and provides a shaft opening 92 extending therethrough to receive the locking shaft 50. Secured to or formed as part of an underside of the inner flange 90 may be an upper retainer 96. An underside of the upper retainer 96 provides a plurality of tee cavities 97A-D, wherein the number of cavities 97 corresponds to the number of shaft sides 63. Each cavity 97 may provide a pair of opposed undercut tee ridges 98. Slidably received in the tee cavities 97, in ninety degree increments, or other appropriate angular increments depending on the number of shaft sides 63, is a corresponding upper tee 99, wherein each tee 99 has a suffix A-D which corresponds to the number of sides of the locking shaft 50 which provide the shaft teeth 64 A-D. Each tee 99 has outwardly extending side rails 100 that define corresponding side grooves 101. And each tee has an opening 102 extending therethrough. And the tee ridges 98 of each corresponding cavity 97 are slidably received in the side grooves 101. Accordingly, each upper tee 99 is linearly movable along an underside of the upper retainer. Indeed, each upper tee is radially movable with respect to the locking shaft.

Each upper tee 99, as best seen in FIGS. 3A, and 4-8, is connected to a corresponding wedge jaw 103A-D which provides for a jaw body 104A-D connected to the upper tee 99 by a fastener 107 received in the opening 102. Each jaw body 104 has a tee surface 105 at a top end thereof wherein a pair of opposed tee ridges 106 may extend from the sides of the tee surface 105. As such, the ridges 106 prevent side to side movement of the upper tee 99 with respect to the jaw body 104. The jaw body 104 also provides a plurality of jaw teeth 108A-D which fit into the corresponding gaps 66A-D provided by the shaft teeth 64A-D. In other words, the jaw teeth 108A-D provide for gaps 109 therebetween which receive the corresponding shaft teeth 64. With the wedge jaws 103A-D engaged by the shaft sides 63A-D, the locking member 30 is secured into the chucking assembly 32. On a surface opposite or angularly disposed from the jaw teeth 108A-D is a jaw incline surface 110A-D. Each incline surface 110 may provide an indented pocket 111 that is sized to receive a back-up plate 112. As best seen in FIG. 5B, extending from lengthwise sides of the plate 112 are outwardly extending ledges 113 which with the incline surface 110 form a gap therebetween. Fasteners 114 may extend through the plate 112 for attachment to the jaw body 104.

Figure 6:
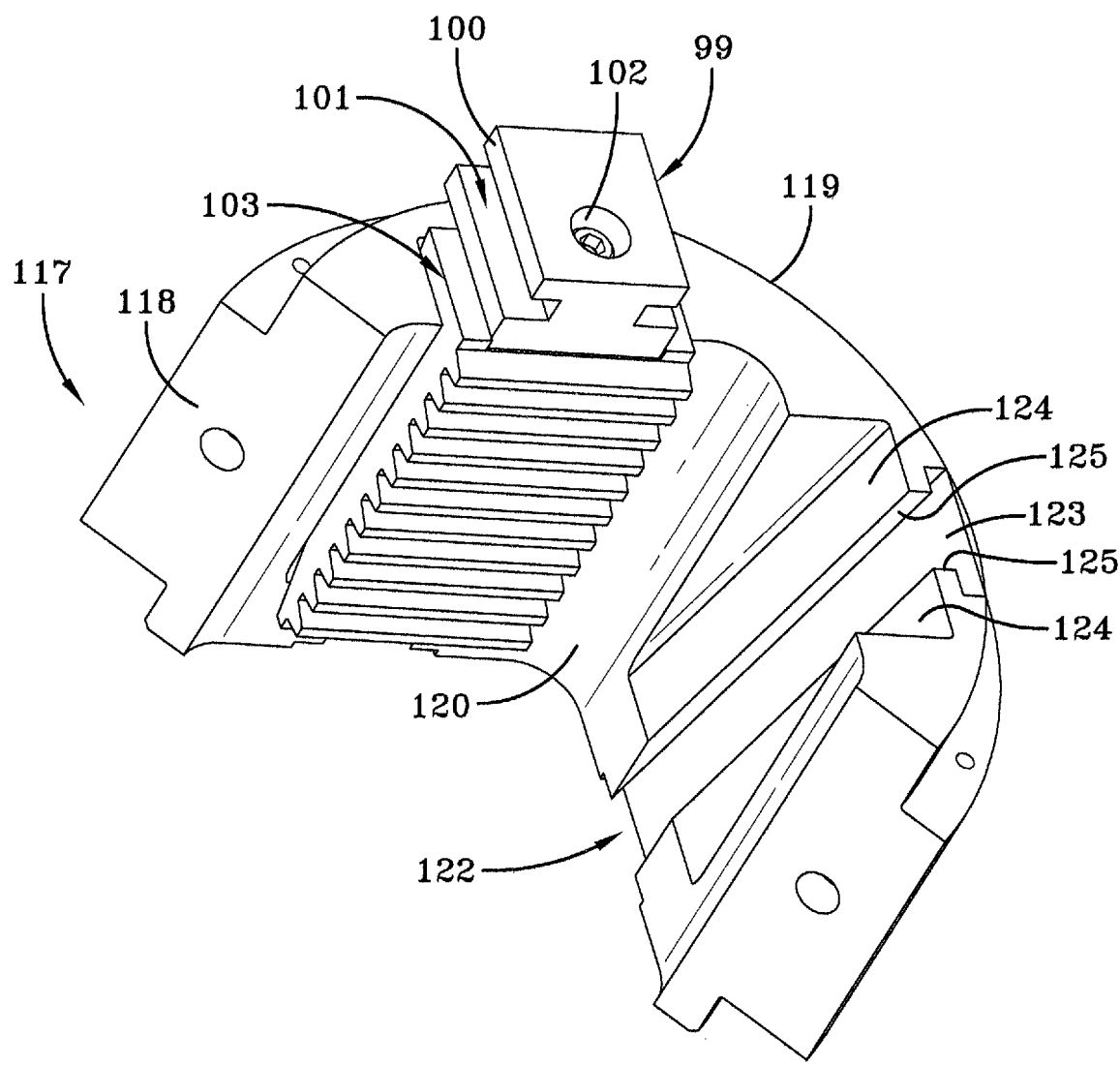
FIG. 6 is a perspective view of a wedge sleeve showing a wedge jaw received therein, wherein the wedge sleeve and the wedge jaw are part of the chucking assembly used in accordance with the concepts of the present invention.

A wedge sleeve 117, which is best seen in FIGS. 6-8, may be provided in a predetermined number of segments, and may be coupled to slidably receive adjacent wedge jaws 103, so as to provide structural support thereto when the locking shaft is received in the chucking assembly and also to allow slidable movement within the spindle assembly as will be described. As seen in the drawings, two wedge sleeves, of similar shape, may be provided and received within the spindle assembly 34 as seen in FIG. 3A, wherein each wedge sleeve 117 may be associated with a pair of wedge jaws 103. In other words, the wedge sleeve 117A may be associated with wedge jaws 103A and 103B, and the wedge sleeve 117B may be associated with wedge jaws 103C and 103D.

Referring again to FIGS. 6-8, each wedge sleeve 117 provides a sleeve body 118 which may be semi-circular in shape and sized so that both sleeve bodies 118 are received in the spindle assembly 34 in a manner that will be discussed. Each sleeve body 118 provides an outer semicircular surface 119 on one side and an inner facing jaw surface 120 which is opposite the semi-circular surface 119. The jaw surface 120 is configured so as to receive the corresponding wedge jaws, and in particular provides for two wedge jaw pockets 122, wherein each pocket slidably receives a corresponding wedge jaw 103. The wedge jaw pocket 122 includes a plate ramp 123 which slidably receives and bears against the back-up plate 112. Extending from either or both sides of the plate ramp 123 is an edge ramp 124 which is not as deeply recessed as the plate ramp 123. Each edge ramp 124 extends from both sides of the plate ramp 123 and may form a rail 125 received in the gap between the incline surface 110 and the extending ledges 113, wherein the edge ramps 124 may slidably support and bear against the sides of the incline surface 110 not covered by the back-up plate 112. Skilled artisans will appreciate that the angles of the ramps 123 and 124 correspond to the angles of the incline surface 110 and the received back-up plate 112. In particular, the extending ledges 113 may be received in the gap between the rails 125 and the plate ramp 123 and may also bear against the plate ramp 123. It will further be appreciated that as the wedge sleeves 117 move within the spindle assembly, in a manner that will be discussed in detail, the wedge jaws 103 and their respective connected upper tee 98, which is connected to the top of the jaw body 104, will also slidably move in relation to the upper retainer 96.

As best seen in FIGS. 1, 2, 3A, 3B, 3C, and 13, the spindle assembly 34 is coupled to the chucking assembly 32 at one end and to the frameless motor assembly 40 at an opposite end. The spindle assembly 34 is supported externally by the outer housing 24 and is rotatable therein, as will be discussed. The major components of the spindle assembly 34 may include a main spindle 130 which may be secured at one end to the upper retainer 96 of the lower rim 86 and at the other end to a drive spindle assembly 200 which is a rotatable component of the motor assembly 40. Maintained within the main spindle 130 is an inner sleeve 132 which may be coupled at one end to the wedge sleeves 117. A locking device spring 134 may be interposed between the inner sleeve 132 and a component of the motor assembly as will be discussed.

Figure 3B:
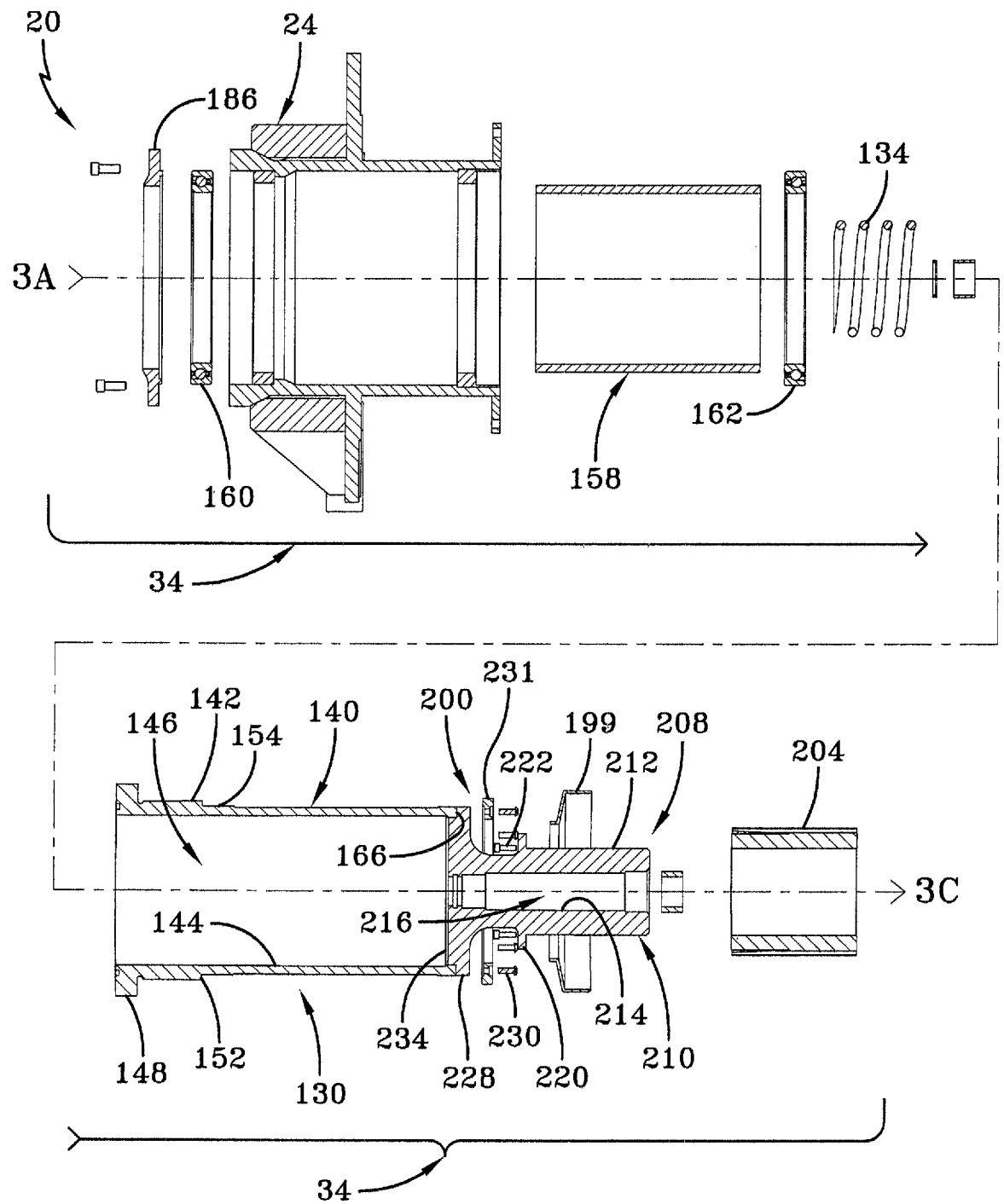
Figure 3C:
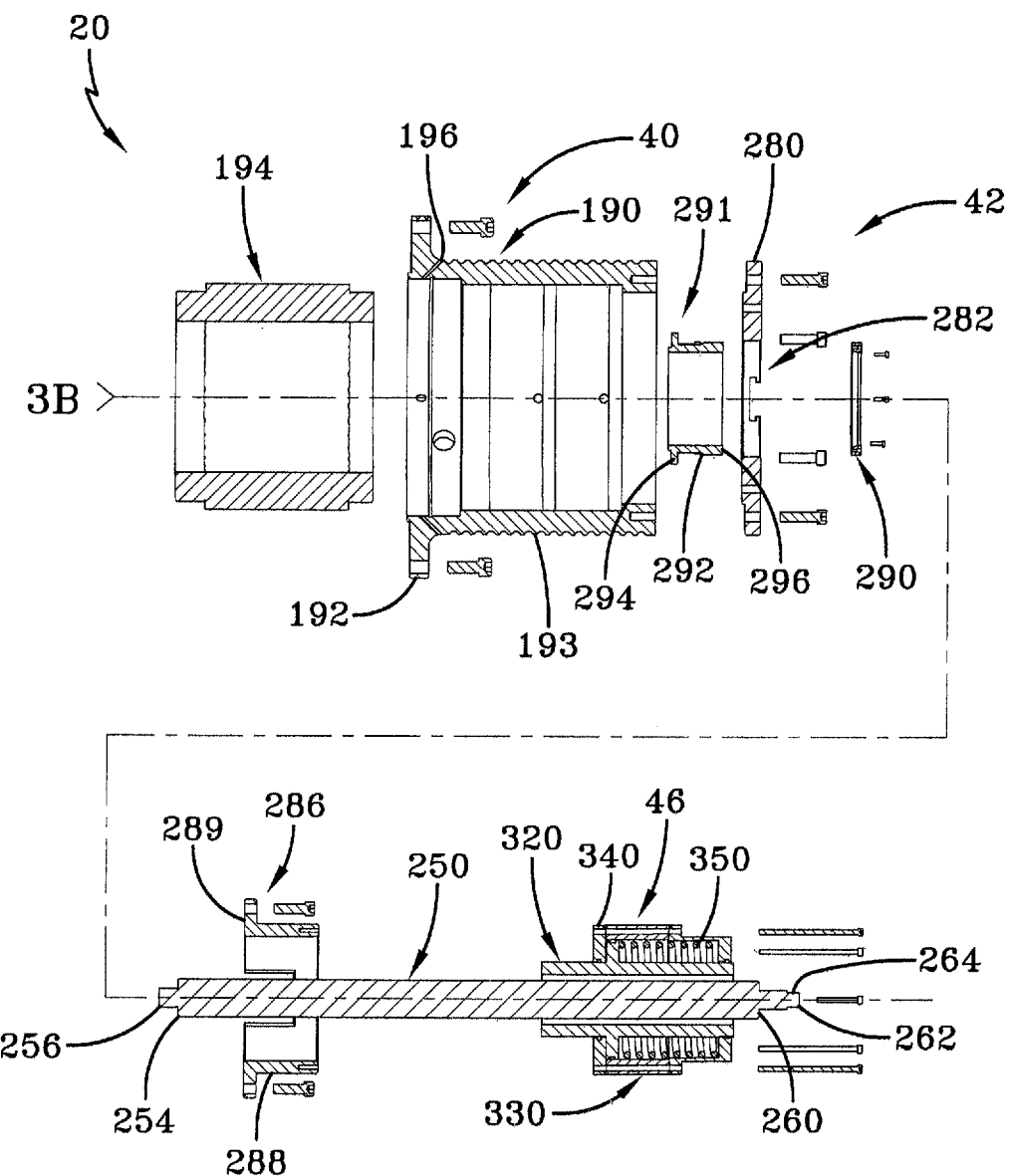

As best seen in FIGS. 3A-C, the main spindle 130, which may be a substantially tubular configuration, includes a main spindle body 140 which has an outer surface 142 opposite an inner surface 144. Extending through the main spindle body 140 is a body opening 146 which receives at least a portion of the chucking assembly 32 which may or may not have the locking member 30 received therein. The main spindle body 140 provides a spindle rim 148 at a top end which may be connected and fixed to the upper retainer 96 by appropriate fasteners. The outer surface 142 provides for a step edge 152 that extends substantially perpendicularly inward to a step surface 154 which is of a smaller diameter than the outer surface 142. In the embodiment shown, a spacer tube 158 may be received on the step surface 154 and in contact therewith. Skilled artisans will appreciate that the spacer tube 158 rotates with the main spindle body 140. Disposed and captured between the step edge 152 and an end of the spacer tube 158 is an upper bearing 160 wherein an outer race of the upper bearing is positioned against and captured by an inner surface of the outer housing 24 and an inner race of the upper bearing is positioned against the step edge 152 and the step surface 154. A bearing retainer 186 may be fastened to the outer housing 24 to hold the upper bearing in place and keep contaminants from entering the outer housing and spindle assembly. In a similar manner, an inner race of a lower bearing 162 is captured between the other end of the spacer tube 158 and the step surface 154, and an outer race of the bearing 162 is positioned adjacent the inner surface of the outer housing 24. The main spindle body 140 provides a spindle end surface 166 which is opposite the spindle rim 148 and which connects the outer surface 142 to the inner surface 144.

Referring again to FIGS. 1, 2, and 3A, rotatably and axially slidable within the main spindle body 140 is the inner sleeve 132, which is part of the chucking assembly 32. The inner sleeve includes a sleeve body 170 which provides for a radially outward extending outer collar 172 at one end and a radially inwardly extending and substantially closed shaft seat 174 at an opposite end. The outer collar 172 is secured and fastened to an end of the sleeve body 118 that is positioned opposite the lower rim 86. Extending radially outwardly from the sleeve body 170 near the shaft seat 174 is a radial rim 178. Extending from the outer collar 172 into the sleeve body 170 is a sleeve opening 180 which is sized so as to receive the locking member and, in particular, the locking shaft 50. Extending into the shaft seat 174 is a shaft bore 182, which may be internally threaded, and shaft seat countersink 183 may also extend into the shaft seat 174 and be concentrically aligned with the shaft bore. One end of the locking device spring 134 may be received around the shaft seat 174 wherein one edge of the spring 184 may be supported by a radially extending surface of the radial rim 178.

The frameless motor assembly 40 may be coupled to the spindle assembly 34, as best seen in FIGS. 1, 2, 3A-C, and 13. Specifically, the assembly 40 may be coupled to the main spindle 130 and the outer housing 24. The frameless motor assembly 40 is generally used to rotate the upper and lower rims and the attached tire by virtue of the connections through the spindle assembly 34 and the chucking assembly 32. The assembly 40 provides a motor housing 190 which includes a radially extending housing rim 192 which may be attached and fixed to a flange of the outer housing 24. In some embodiments, the motor housing 190 may be provided with external radial cooling fins 193 which assist in dissipating heat generated during operation of the motor assembly. Maintained within the motor housing is a stator 194 which is secured to an inner surface of the motor housing 190 by an epoxy or other appropriate adhesive material wherein either or both of an outer surface of the stator 194 and the inner surface of the motor housing may be grooved or otherwise modified to facilitate a secure bonded connection between the two pieces. Additionally, the epoxy may fill into a number of transversely extending pipe plugs 195. In most embodiments, the pipe plugs 195 may be transverse holes filed with a heat conductive epoxy that assists in transferring heat from inside the motor assembly to ambient.

Near the housing rim 192 and extending transversely through the housing, as best seen in FIGS. 1, 3B, 3C, and 13, is at least one drain port 196 which may be oriented and inclined downwardly with respect to the rim. In some embodiments, multiple drain ports may be spaced around the housing rim in substantially equal increments. Positioned in the motor housing and underneath the spindle assembly may be an annular and frusto-conically shaped deflector shield 199, wherein an outer edge of the shield is substantially aligned with the at least one drain port 196. Any lubricating oil or other fluids that may pass from the spindle assembly or chucking assembly are deposited on the shield and pass through the ports so as to prevent their entry into the motor assembly. Operatively associated with the stator 194 is a drive spindle assembly designated generally by the numeral 200.

Referring again to FIGS. 1, 2, 3A-C, and 13, the drive spindle assembly 200 includes a rotor 204 which rotates when electrical current is applied to the stator as is well known in the art. Secured to an interior and/or edge surface of the rotor 204 is a lower spindle 208. The lower spindle 208 includes a lower spindle body 210 which has an outer surface 212 opposite an inner surface 214. Extending through the lower spindle body 210 is a shaft opening 216 that is defined by the inner surface 214. As is evident in the drawings, the rotor 204 is positioned immediately adjacent but not in contact with an inner surface of the stator 194. The body 210 may also provide a radial rotor flange 220 which extends radially from the outer surface 212 wherein fasteners 222 may be used to connect the radial rotor flange 220 to an end of the rotor 204. Extending axially and radially from the lower spindle body 210 is a spindle flange 228. The spindle flange 228 receives fasteners 230 which connect the flange to the spindle end surface 166 of the main spindle body 140, wherein the lower spindle body 210 and the main spindle body 140 together form the main spindle 130. A support ring 231 may also be secured to the flange 228 by the fasteners 230 to support the inner race of the lower bearing 162. Therefore, as the rotor 204 rotates, the drive spindle assembly 200 rotates along with the main spindle 130 which in turn rotates the lower rim 86 and the locking shaft 50, when received in the chucking assembly 32, which also simultaneously rotates the upper rim. The spindle flange 228 provides a flange surface 234 which supports the locking device spring 134 at one end, wherein the other end of the spring is supported by the radial rim 178 of the inner sleeve 132.

A spindle shaft designated generally by the numeral 250 is received through the shaft opening 216 of the lower spindle body 210, as seen in FIGS. 1, 2, 3A-C, 9, and 13. As will be appreciated as the description proceeds, the lower spindle body 210 rotates with the spindle shaft 250 and is supported by at least two bearings 252 which are positioned at respective ends of the lower spindle body's inner surface 214. And at the appropriate time, the spindle shaft 250 may be axially movable within the lower spindle body. As such, skilled artisans will appreciate that the spindle shaft 250 is used to support the rotation of the lower spindle body and the rotor 204. The spindle shaft 250 provides for a sleeve end 254 with a shaft tip 256, which may be externally threaded, that extends into the shaft bore 182 of the inner sleeve 132 and wherein a portion of the shaft 250 may extend into the countersink 183. Accordingly, the spindle shaft is fixedly secured to the inner sleeve 132 so that axial and rotational movement of the spindle shaft results in corresponding axial and rotational movement of the inner sleeve 132 and the attached wedge sleeves 117. And it will further be appreciated that the spindle shaft 250 may be axially movable within the locking device spring 134, which in the embodiment shown is a coil spring, although other biasing devices may be employed.

As best seen in FIGS. 1, 2, 3A-C, and 9-13, an opposite end of the spindle shaft 250 includes a cap end 260 from which axially extends a cap tip 262 which may provide an externally threaded surface 264. The threaded surface 264 may receive a shaft cap 268. A hex nut 272 may be used to secure the shaft cap to the cap tip 262 of the spindle shaft.

An encoder assembly 42 is positioned between the frameless motor assembly and the spring-biased return cylinder 46, as seen in FIGS. 1,2,3A-C, and 9-13. The encoder assembly 42 includes a mount plate 280 which extends from and is connected to the motor housing 190 wherein a plate opening 282 extends therethrough to allow for the spindle shaft 250 to pass therethrough. The mount plate 280 may provide at least one plate notch 283. The assembly 42 may also include an encoder ring standoff 291 which provides a tubular body 292 wherein the spindle shaft 250 extends therethrough. The ring standoff 291 may include a spindle end 294 which is connected to the drive spindle assembly 200 and specifically to the rotor 204 and/or the lower spindle body 210. Opposite the spindle end 294 is a mount end 296.

An encoder ring 290 is secured to the mount end 296 and, as a result, extends axially away from the mount plate 280. Accordingly, rotation of the spindle assembly and specifically the rotor 204 results in corresponding rotation of the encoder ring standoff 291 and the encoder ring 290. A cylindrical mount 286 may also be a part of the encoder assembly 42. The cylindrical mount 286 may provide a mount body 288 which has an opening therethrough to accommodate the shaft 250. A mount flange 289 radially extends from one end of the body 288 wherein fasteners are used to secure the mount 286 to the mount plate 280.

Figure 9:
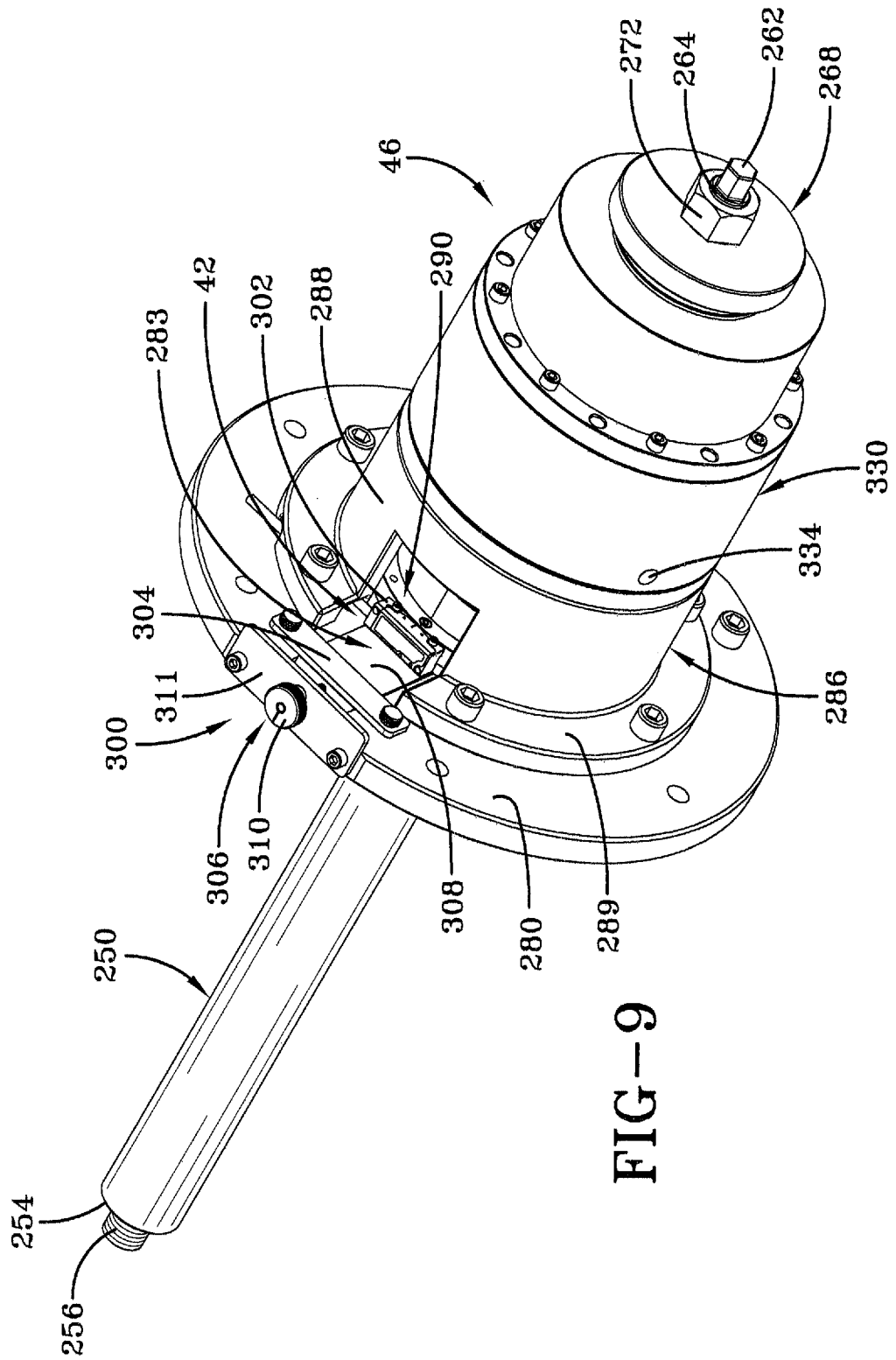
FIG. 9 is a perspective view of an encoder assembly and a spring-biased return cylinder used in the dynamic balancer according to the concepts of the present invention.
Figure 10:
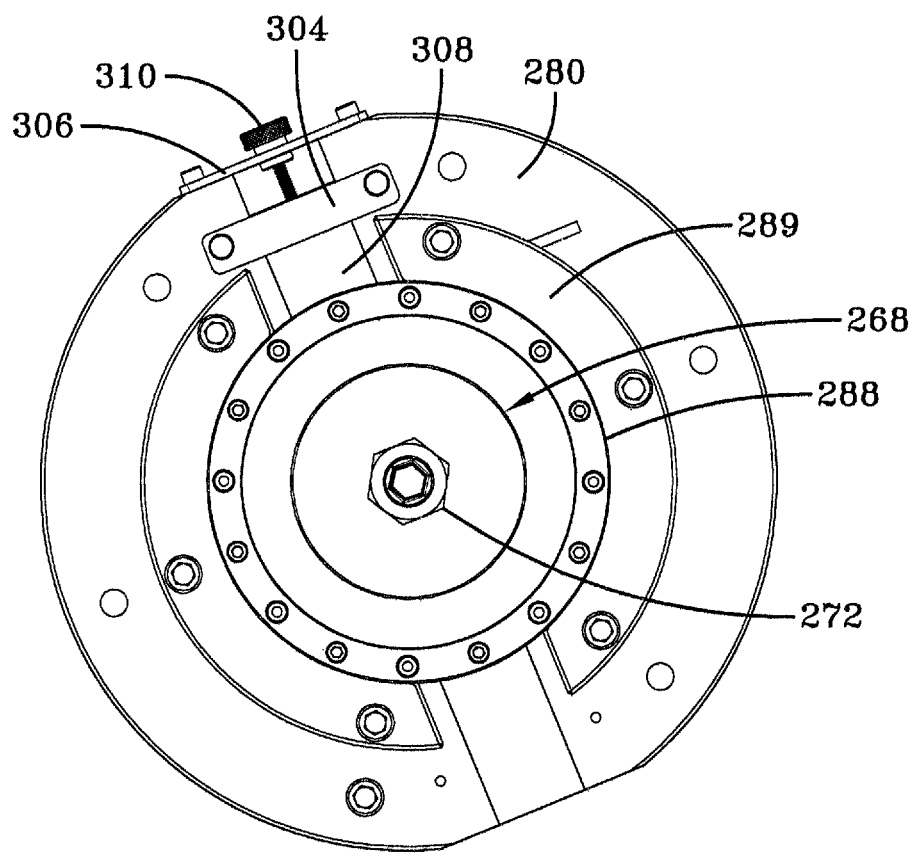
FIG. 10 is an end view of the encoder assembly and the spring-biased return cylinder according to the concepts of the present invention.

A sensor mount, which is best seen in FIGS. 9 and 10, designated generally by the numeral 300, is juxtaposed with the encoder ring 290 wherein the sensor mount holds a read head 302, which is aligned with the plate notch 283 and which detects the rotational position of the rotor and the spindle assembly by monitoring the rotational position of the encoder ring 290.

A locking bar 304, which is best seen in FIGS. 9 and 10, is utilized to movably hold the position of the read head 302 on the mount plate 280 in a desired location with respect to the encoder ring 290. This is accomplished by use of an adjustment mechanism 306 which may include an adjustment bar 308, which may be slidably received in the plate notch 283. An adjustment knob 310, which has a shaft that may extend into the adjustment bar 308, moves the adjustment bar to properly position the read head 302 in relation to the encoder ring 290. The adjustment knob 310 extends through a plate 311 that is secured to a radial edge of the mount plate 280. The locking bar 304 will hold the adjustment bar 308 in place once the position of the read head is set. Skilled artisans will appreciate that the sensor mount is removable so as to allow replacement, adjustment, and/or maintenance of the read head 302 without total disassembly of any other portion of the balancer 20.

An appropriate position signal is generated by the read head 302 upon detection of encoder ring movement and transmitted to a control system (not shown) which coordinates or associates the rotational position of the tire during the rotation of the main spindle. This information along with other sensor information obtained during the rotation of the tire by the spindle assembly is utilized to determine a radial balance location of the tire under test. In other words, location of an angular displacement of rotation of either a heavy spot or light spot of the tire can be obtained with the data generated from the load cells and the encoder.

The spring-biased return cylinder 46, which is best seen in FIGS. 9 and 11-13, may be carried by or mounted to the cylindrical mount 286 and surrounds an end of the spindle shaft 250, but does not touch the spindle shaft. The cylinder 46 includes a main cylinder 320 which has a shaft opening 322 therethrough. Extending from the main cylinder 320 is an external radial ledge 324 which provides a spring surface 326 on one side and a ledge surface 327 on an opposite side. The main cylinder 320 also includes a cap surface 329 that connects an inner and an outer surface of the main cylinder and which faces the shaft cap 268. Annularly surrounding the main cylinder 320 is an outer cylinder 330 which has a cylinder wall 332 from which extends radially inward an internal radial ledge 336 that in a default condition is positioned adjacent, and in some embodiments in touching contact with, the ledge surface 327. Also extending radially inward from the cylinder wall 332 is an inward spring ledge 333. And extending axially from the outer cylinder 330 is a mounting bracket 340, which extends between the cylinder wall 332 and the internal radial ledge 336, and which is secured by fasteners or otherwise to the mount body 288.

Moreover, the internal radial ledge has a ledge sealing surface 342 that seals around an outer surface 343 of the main cylinder 320. Together, the main cylinder 320 and the outer cylinder 330 form an annular spring cavity 344 between an outer surface of the main cylinder 320 and an inner surface of the outer cylinder 330 and between the spring surface 326 and the inward spring ledge 333. A plurality of fasteners 346 extend axially through the cylinder wall 332 and connect the mounting bracket 340 to the internal radial ledge 336 and a lower edge of the mount body 288. Disposed within the annular spring cavity 344 is a cylinder spring 350 which is biased between the outer cylinder and the main cylinder and, in particular, between the spring surface 326 and the inner facing spring ledge 333.

Figure 11:
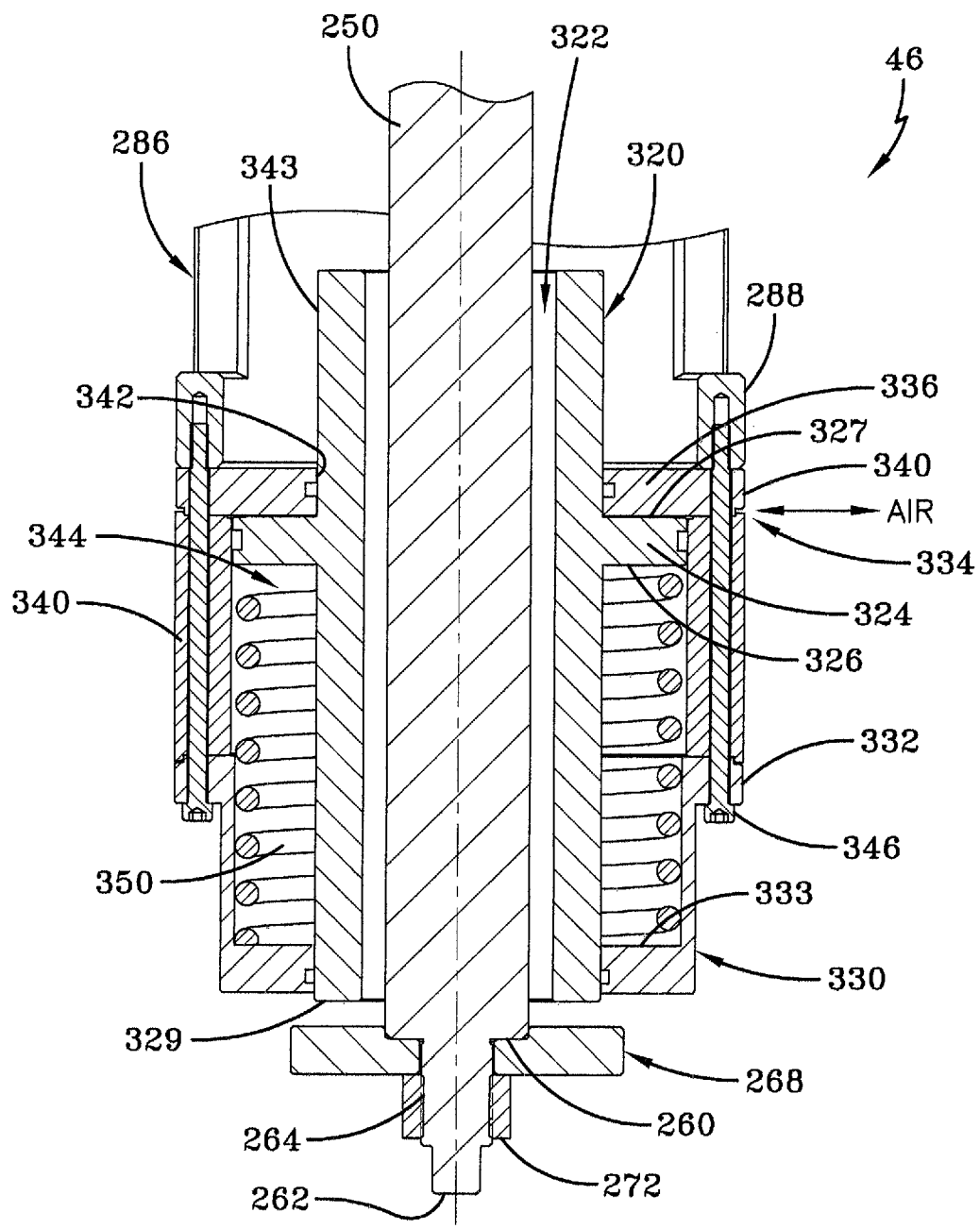
FIG. 11 is an enlarged cross-sectional view of the spring-biased return cylinder shown in the default position according to the concepts of the present invention.
Figure 12:
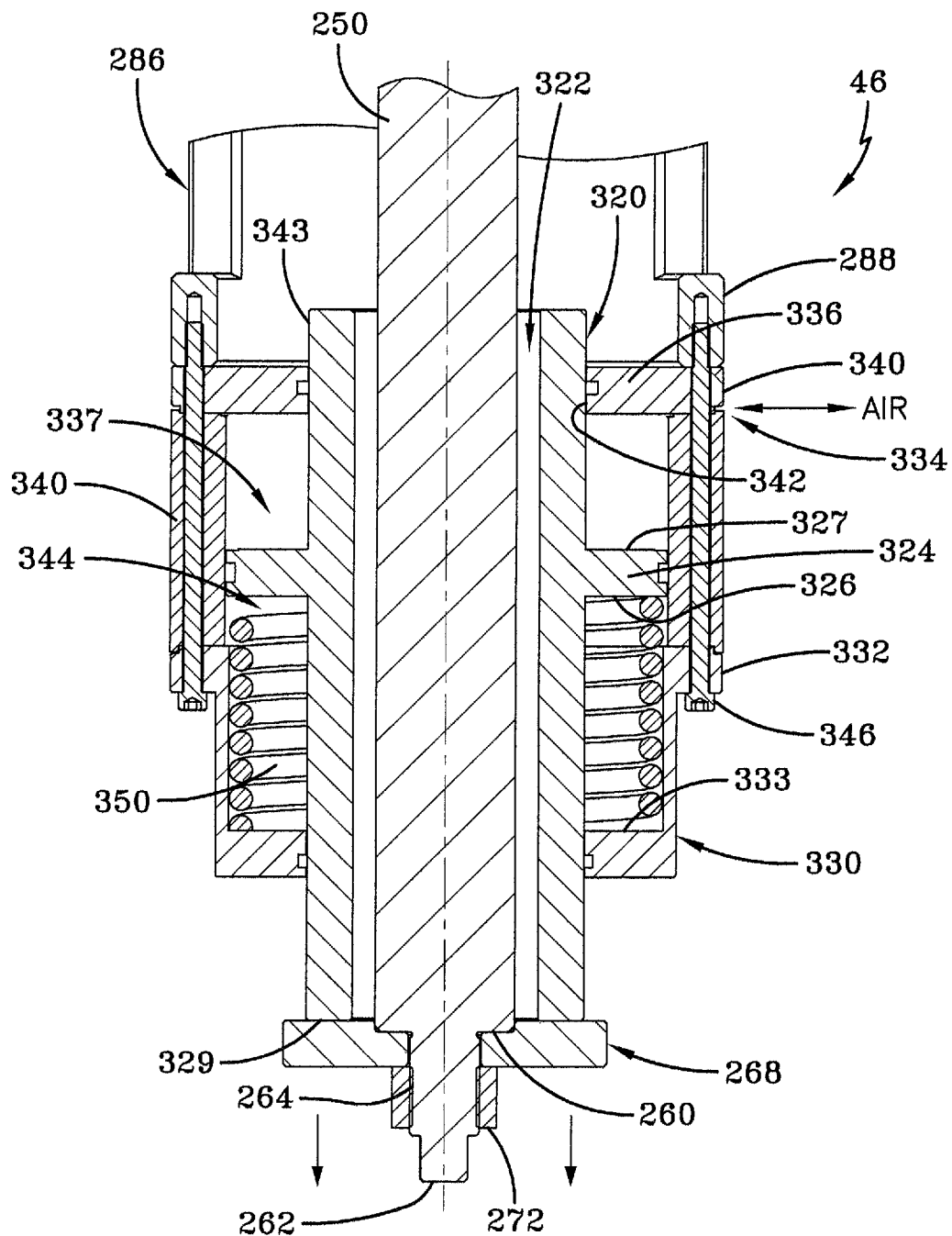
FIG. 12 is an enlarged cross-sectional view of the spring-biased return cylinder shown in the unlocked position according to the concepts of the present invention.

As best seen in FIG. 9, extending through the main cylinder wall is a port 334 through which pressurized air may be delivered. As can be seen in FIGS. 9, 11 and 12, the port delivers pressurized air between the internal radial ledge 336 and the adjacent ledge surface 327. The internal radial ledge 336, the ledge surface 327, an outer surface of the main cylinder 320, and an inner surface of the outer cylinder 330 form an annular cavity 337 which receives the pressurized air delivered through the port 334. Delivery of air through this port and into the cavity 337 causes the external radial ledge 324 of the main cylinder to move from a default position and compress the cylinder spring 350, which in turn drives the cap surface 329 axially away from the motor housing. The surface 329 engages and moves the shaft cap 268, which in turn moves the spindle shaft 250 axially away from the motor assembly so as to move the spindle shaft to a release position. Release of the air from the cavity 337 allows the spring to expand and thus removes the driving force of the cap surface 329 away from the shaft cap 268. This returns the spindle shaft to its normal default position. Skilled artisans will appreciate that the return cylinder only applies a force to the spindle shaft 250 and the dynamic balancer to disengage the chucking assembly 32 from the locking shaft 50 which allows removal of the tire from the balancer. The return cylinder does not apply any forces during rotation of the spindle assembly. As a result, no extraneous forces are imparted by the return cylinder to the balancer 20 during a tire balancing operation.

Figure 14:
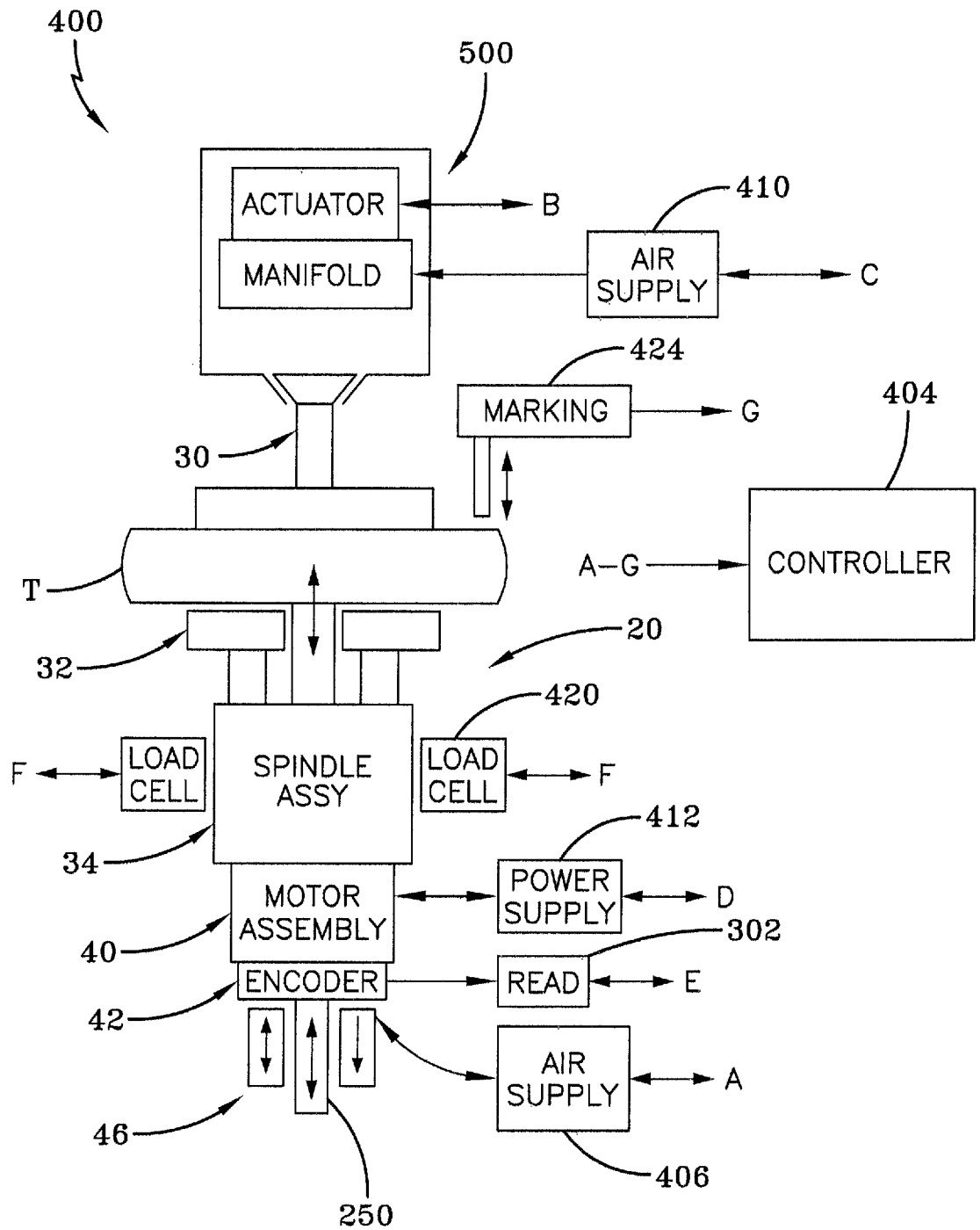
FIG. 14 is a schematic diagram of a control system utilized to operate the dynamic balancer according to the concepts of the present invention.

Referring now to FIG. 14, it can be seen that a control system is designated generally by the numeral 400 and is utilized to operate the dynamic balancer 20, which is shown schematically. However, reference should also be made to all the other drawings and the description above. The control system 400 includes a controller 404 which provides the necessary hardware, software, and memory to control the various components of the balancer and facilitate its operation. The controller 404 receives input signals and sends output signals to various components of the balancer 20 so as to control and coordinate their specific operation. A pressurized air supply 406 is coupled to the return cylinder 46 wherein the pressurized air is utilized to operate the chucking assembly 32. The air supply 406 is controlled by the controller 404 via the control signal designated by the capital letter A.

The dry air brake mechanism 500 may be selectively coupled to the locking member 30 for the purpose of inserting the locking shaft into the chucking assembly at the appropriate time for capturing a tire and running the balancing test and withdrawing the locking member when the balancing test is complete. The mechanism 500 is controlled by the controller 404 via the control signal designated generally by the capital letter B. A pressurized air supply 410 is coupled to the locking member through the mechanism 500 for the purpose of delivering pressurized air into the tire when it is captured between the upper and lower rims. The pressurized air supply 410 is operatively controlled by the controller via the control signal designated generally by the capital letter C. After the balancing operation is complete, the tire is deflated and the air is exhausted through the mechanism 500 as described above.

A power supply 412 is coupled to the motor assembly 40 for the purpose of delivering electrical power thereto, which rotates the rotor and the spindle components at the appropriate time and speed. The controller 404 sends and receives a control signal to the power supply which is designated by the capital letter D.

Rotation of the rotor and spindle components is detected by the encoder assembly 42 and in particular by the read head 302. The controller 404 receives the position signal generated by the read head and which is designated by the capital letter E.

At least one load cell 420, and in the embodiment shown four load cells may be employed, is positioned about the outer circumference of the outer housing 24 wherein the load cells are positioned in an operative relationship with the frame 22 and communicate with the controller 404 via the control signal F. The load cells detect forces generated by the rotating tire which are used to determine if the tire is out of balance and, if so, by how much and the location of the out of balance condition on the tire. Once the operation of the balancer is complete, an out of balance position of the tire may be determined, and the controller 404, in conjunction with the position signal generated by the read head 302, will operate a marking system 424 to mark the appropriate spot on the tire sidewall indicating the location and balance condition of the tire. The marking system 424 is controlled via the signal designated generally by the capital letter G.

Figure 13:
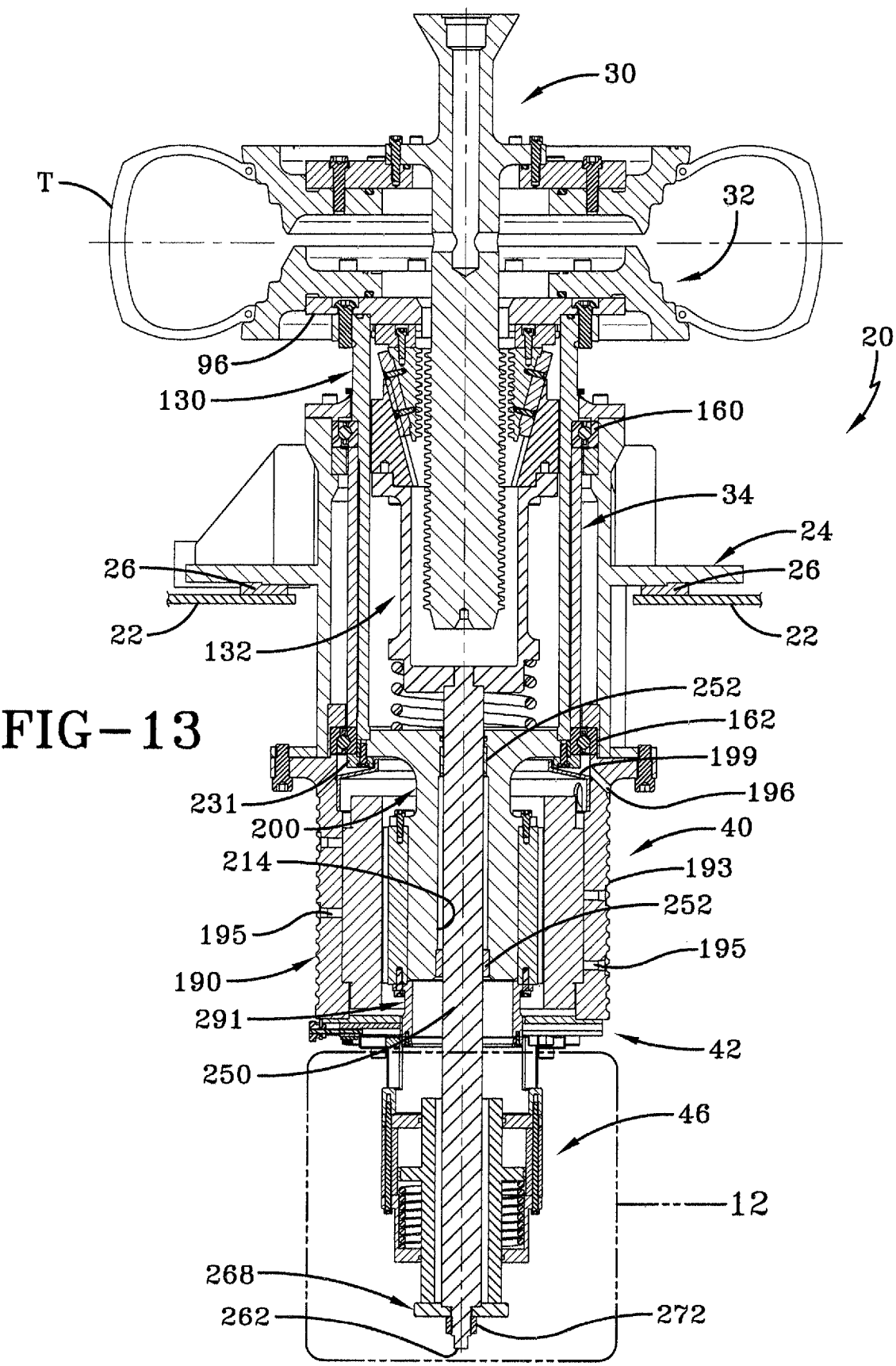
FIG. 13 is a cross-sectional view of the dynamic balancer shown in the unlocked position according to the concepts of the present invention.

In operation, with reference to FIG. 14, the balancer is shown in a locked default condition in FIGS. 1 and 11 and an unlocked condition in FIGS. 12 and 13. In the default condition, the locking member 30 is received within the chucking assembly 32 and locked into position so that no extraneous forces can separate the locking member from the chucking assembly. In order to operate the balancer, the controller 404 will send a signal to the air supply 406 whereupon pressurized air is delivered to the spring-biased return cylinder 46. This pressurized air causes the main cylinder to compress the cylinder spring 350 such that the cap surface 329 engages the shaft cap 268, which in turn causes the spindle shaft 250 to axially move through the lower spindle 208. This axial movement causes the inner sleeve 132, which is attached to the spindle shaft, to move axially so as to compress the locking device spring 134. This axial movement in turn causes the inner sleeve 132 to axially move the wedge sleeves 117 within the main spindle body 140. This axial movement of the wedge sleeves results in the outward radial movement of the wedge jaws 103 and in turn the upper tees 99 as represented in FIG. 8. As a result, the jaw teeth 108 disengage from the shaft teeth 64 wherein the jaw teeth were previously received in corresponding gaps 66 (see FIG. 8). This disengagement allows for the locking shaft to be axially removed from the chucking assembly by the mechanism 500 as described above. The air coupling 520 and the coupling mate 504 are re-engaged to deflate the tire. Next, the linear actuator 564 retracts which causes the flange inner surface 556 to engage and lift the taper 52 so as to lift the locking shaft 50 out of the chucking assembly.

This axial removal separates the upper rim from the lower rim so that any tire received therebetween may be moved on to the next manufacturing station and allows for receipt of the next tire to be tested by the balancer. Once the next tire is preliminary positioned between the two rims, the controller 404 will determine the angular orientation of the locking member and the chucking assembly through the encoder assembly—which knows the angular position of the chucking assembly, the spindle assembly, and the motor assembly. The controller 404 then adjusts the position of the spindle assembly through the motor assembly so that a home position is obtained whenever the locking member is received. This ensures consistency of the dynamic balancer test results. Next, the controller actuates the mechanism 500 to allow the actuator rod 568 to gradually lower the manifold 512 and the air coupling 520. As a result, in a controlled manner, the air coupling 520 mates with the coupling mate 504 and the locking shaft 50 is lowered into the proper position within the chucking assembly. In other words, the locking shaft is lowered a specified distance to capture the tire, which has a known bead width between the two rims. The locking shaft is simultaneously received in the chucking assembly which is still in an unlocked position.

Next, the controller withdraws the pressurized air from the return spring cylinder which causes the chucking assembly to secure the locking shaft in position so as to capture the new tire in between the upper and lower rims. Specifically, withdrawing the air from the return spring cylinder allows the spindle shaft to return to its default position which in turn re-engages the chucking assembly with the locking member. Indeed, the wedge sleeves 117 are allowed to return to their original position which in turn moves the upper tees into engagement with the shaft (see FIG. 7). Once the chucking assembly re-engages with the spindle assembly, the controller instructs the air supply to inflate the tire and also to further lower the inner surface 556 to no longer contact the taper 52 and disengage the air coupling 520 from the coupling mate 504 in such a way that the tire remains pressurized. Next, the power source 412 to deliver electrical power to the motor 40 which in turn initiates rotational movement of the rotor and the associated components of the main spindle. Accordingly, the motor assembly rotates the rotor at the desired speed and the rotational position is monitored by the encoder. Simultaneously, the load cells 420 detect forces generated by the particular tire received between the rims and this information is correlated with the rotational position information provided by the encoder. Upon completion of the test rotations by the spindle assembly, the controller determines whether the tire has an out of balance condition or not and then instructs the marking system 424 to mark the appropriate position on the tire. Skilled artisans will appreciate that the controller may send precise signals to the motor 40 so as to properly position the tire under the marking device of the marking system 424. Upon completion of the marking operation, the above process is repeated so as to release the tire and move it on to its next manufacturing operation.

A number of distinct advantages are provided by the balancer disclosed herein. First, the locking member is provided with a non-circular cross section and in the present embodiment a square cross-section, so as to allow for the positive gripping of the locking member in a specific orientation. This permits significant gripping forces to be applied by the chucking assembly to the locking member so that it can be rotated at a significant speed without undue vibrations and/or stresses on the other components of the balancer. In the present embodiment, a home position may be utilized so that the locking member is always received within the chucking assembly at the same orientation. Skilled artisans will appreciate that this minimizes the determination of a characterizing force of the locking assembly when rotated at speed so as to accommodate any particular forces unique to the balancer.

Yet another advantage of the present invention is that the frameless motor assembly is utilized to rotate the spindle assembly. This is significant in that minimal extraneous forces are introduced by the motor assembly as the spindle assembly is not driven by a belt mechanism or other rotational feature that imparts extraneous forces during the detection of forces by the load cells. Still another advantage of the present invention is the employment of the return air cylinder which allows for positive engagement by the chucking assembly with the locking member. This is further facilitated by the non-circular cross section of the locking member and the use of positively engaging teeth between the chucking assembly and the locking member wherein those teeth easily engage with one another. The motor assembly is also advantageous in its construction in that cooling fins and heat conducting epoxy are utilized in its construction to dissipate the heat generated by the motor which allows for the application of higher power so as to rotate the rotor assembly and the spindle assembly at significantly higher speeds than found with other dynamic balancers.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A dynamic balancer, comprising:
an outer housing;
a spindle assembly rotatably mounted to said outer housing and having a spindle shaft;
a frameless motor assembly comprising a stator coupled to said outer housing and a rotor rotatably received within said stator, said frameless motor assembly being connected to said spindle shaft;
said rotor having an interior surface with a lower spindle secured thereto; and
a chucking assembly receiving a locking member to capture a tire therebetween, said chucking assembly and said locking member captured in said spindle assembly and rotated by said frameless motor assembly;
said spindle shaft extending through said frameless motor, and an end of said spindle shaft axially moving said chucking assembly to engage and disengage said locking member in said spindle assembly.

2. The dynamic balancer according to claim 1, said dynamic balancer further comprising:
an encoder assembly comprising:
an encoder ring connected to said rotor; and
a read head held in a fixed position to detect a rotational position of said encoder ring.

3. A dynamic balancer, comprising:
an outer housing;
a spindle assembly rotatably mounted to said outer housing;
a frameless motor assembly connected to said spindle assembly;
a chucking assembly receiving a locking member to capture a tire therebetween, said chucking assembly and said locking member captured in said spindle assembly and rotated by said frameless motor assembly; and
a spindle shaft extending through said frameless motor, one end of said spindle shaft axially moving said chucking assembly to engage and disengage said locking member in said spindle assembly;
said frameless motor assembly comprising:
a stator coupled to said outer housing; and
a rotor rotatably received within said stator;
said dynamic balancer further comprising:
an encoder assembly comprising:
an encoder ring connected to said rotor;
a read head held in a fixed position to detect a rotational position of said encoder ring; and
an adjustment mechanism to selectively position said read head in relation to said encoder ring.

4. A dynamic balancer, comprising:
an outer housing;
a spindle assembly rotatably mounted to said outer housing;
a frameless motor assembly connected to said spindle assembly;
a chucking assembly receiving a locking member to capture a tire therebetween, said chucking assembly and said locking member captured in said spindle assembly and rotated by said frameless motor assembly; and
a spindle shaft extending through said frameless motor, one end of said spindle shaft axially moving said chucking assembly to engage and disengage said locking member in said spindle assembly;
wherein said frameless motor assembly comprises:
a stator coupled to said outer housing; and
a rotor rotatably received within said stator, said spindle shaft extending through said rotor, said spindle shaft having a radially extending end cap;
said dynamic balancer further comprising:
a spring-biased return cylinder associated with said rotor, said spring-biased return cylinder comprising:
a main cylinder having a shaft opening therethrough which receives said spindle shaft, said main cylinder having a ledge surface and a spring surface, and a cap surface;
an outer cylinder coupled to said main cylinder, said outer cylinder having an internal radial ledge facing said ledge surface, and an inward spring ledge facing said spring surface; and
a cylinder spring disposed between said inward spring ledge and said surface wherein compression of said cylinder spring results in said cap surface engaging said radially extending cap end to axially move said spindle shaft so as to disengage said chucking assembly from said spindle shaft.

5. A dynamic balancer, comprising:
an outer housing;
a spindle assembly rotatably mounted to said outer housing;
a frameless motor assembly connected to said spindle assembly;
a chucking assembly receiving a locking member to capture a tire therebetween, said chucking assembly and said locking member captured in said spindle assembly and rotated by said frameless motor assembly; and
a spindle shaft extending through said frameless motor, one end of said spindle shaft axially moving said chucking assembly to engage and disengage said locking member in said spindle assembly;
wherein said frameless motor assembly comprises:
a stator coupled to said outer housing; and
a rotor rotatably received within said stator;
wherein said spindle assembly comprises:
a main spindle having a main spindle body with a body opening extending therethrough, wherein one end of said main spindle body is connected to a lower rim of said chucking assembly, and an opposite end of said main spindle body is connected to said rotor;
at least one bearing disposed between said main spindle body and said outer housing;
an inner sleeve received in said body opening and connected to said chucking assembly, said inner sleeve having a sleeve opening to receive said locking member and a shaft seat connected to said spindle shaft; and
a locking device spring interposed between said shaft seat and said rotor.

6. A dynamic balancer, comprising:
an outer housing;
a spindle assembly rotatably mounted to said outer housing;
a frameless motor assembly connected to said spindle assembly;
a chucking assembly receiving a locking member to capture a tire therebetween, said chucking assembly and said locking member captured in said spindle assembly and rotated by said frameless motor assembly; and
an upper rim from which axially extends said locking member which comprises a locking shaft having a plurality of shaft teeth; said chucking assembly having a lower rim which has an inner flange with a shaft opening therethrough that receives said locking shaft, and a wedge jaw with a plurality of jaw teeth, wherein said jaw teeth mesh with said shaft teeth to hold said locking shaft in place so as to rotate with said spindle assembly.

7. A dynamic balancer, comprising:
an outer housing;
a spindle assembly rotatably mounted to said outer housing;
a frameless motor assembly connected to said spindle assembly;
a chucking assembly receiving a locking member to capture a tire therebetween, said chucking assembly and said locking member captured in said spindle assembly and rotated by said frameless motor assembly;
a spindle shaft extending through said frameless motor, one end of said spindle shaft axially moving said chucking assembly to engage and disengage said locking member in said spindle assembly; and
a dry brake air mechanism operatively coupled to said locking member to selectively raise and lower said locking member into and out of said chucking assembly and selectively inflate and deflate the tire when captured.

8. The dynamic balancer according to claim 7, wherein said dry brake air mechanism is de-coupled from said locking member and said spindle assembly during rotation thereof.

* * * * *